United States Patent
Zhu et al.

(10) Patent No.: US 12,411,897 B2
(45) Date of Patent: Sep. 9, 2025

(54) RECOMMENDATION MODEL TRAINING METHOD AND RELATED APPARATUS

(71) Applicant: Huawei Technologies Co., Ltd., Shenzhen (CN)

(72) Inventors: Hong Zhu, Shenzhen (CN); Zhenhua Dong, Shenzhen (CN); Ruiming Tang, Shenzhen (CN); Yuzhou Zhang, Shenzhen (CN); Li Qian, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1081 days.

(21) Appl. No.: 17/360,581

(22) Filed: Jun. 28, 2021

(65) Prior Publication Data

US 2021/0326729 A1    Oct. 21, 2021

Related U.S. Application Data

(63) Continuation of application No. PCT/CN2019/128475, filed on Dec. 25, 2019.

(30) Foreign Application Priority Data

Dec. 29, 2018    (CN) .......................... 201811653380.3

(51) Int. Cl.
    G06F 16/9535    (2019.01)
    G06N 5/04       (2023.01)
    G06N 20/00      (2019.01)

(52) U.S. Cl.
    CPC ........... *G06F 16/9535* (2019.01); *G06N 5/04* (2013.01); *G06N 20/00* (2019.01)

(58) Field of Classification Search
    CPC .............................. G06N 5/04; G06F 16/9535
    See application file for complete search history.

(56) References Cited

U.S. PATENT DOCUMENTS

| 2011/0106817 A1* | 5/2011 | Pan ................... G06Q 30/0282 707/E17.014 |
| 2016/0196534 A1 | 7/2016 | Jarrett et al. |

FOREIGN PATENT DOCUMENTS

| CN | 107133262 A | 9/2017 |
| CN | 107491444 A | 12/2017 |

(Continued)

OTHER PUBLICATIONS

Zhang, Weinan, et al. "Optimizing top-n collaborative filtering via dynamic negative item sampling." Proceedings of the 36th international ACM SIGIR conference on Research and development in information retrieval. 2013. (Year: 2013).*

(Continued)

*Primary Examiner* — Schyler S Sanks
(74) *Attorney, Agent, or Firm* — Conley Rose, P.C.

(57) ABSTRACT

A recommendation model training method includes selecting a positive sample in a sample set, and adding the positive sample to a training set, where the sample set includes the positive sample and negative samples, each sample includes n sample features, n≥1, and the sample features of each sample include a feature used to represent whether the sample is a positive sample or a negative sample, calculating sampling probabilities of the negative samples in the sample set by using a preset algorithm, selecting a negative sample from the sample set based on the sampling probability, and adding the negative sample to the training set, and performing training by using the samples in the training set, to obtain a recommendation model.

20 Claims, 9 Drawing Sheets

(56) References Cited

FOREIGN PATENT DOCUMENTS

| CN | 107578332 A | 1/2018 |
|---|---|---|
| CN | 107729488 A | 2/2018 |
| CN | 108268900 A | 7/2018 |
| CN | 109902708 A | 6/2019 |

OTHER PUBLICATIONS

Zhang, W., et al, "Optimizing Top-N Collaborative Filtering via Dynamic Negative Item Samplin," SIGIR 13, Jul. 28 Aug. 1, 2013, 4 pages.
Juan, Y., et al, "Field-aware Factorization Machines for CTR Prediction," RecSys 16, Sep. 15-19, 2016, 8 pages.
Ricci, F., et al., "Recommender Systems Handbook," In: "Recommender Systems Handbook," Oct. 28, 2010, Springer, XP055260525, 278 pages.

* cited by examiner

RECOMMENDATION MODEL TRAINING METHOD AND RELATED APPARATUS

CROSS-REFERENCE TO RELATED APPLICATIONS

This application is a continuation of International Patent Application No. PCT/CN2019/128475 filed on Dec. 25, 2019, which claims priority to Chinese Patent Application No. 201811653380.3 filed on Dec. 29, 2018. The disclosures of the aforementioned applications are hereby incorporated by reference in their entireties.

TECHNICAL FIELD

The present disclosure relates to the field of big data technologies, and in particular, to a recommendation model training method and a related apparatus.

BACKGROUND

In many machine learning applications (for example, a recommendation system) under the background of big data, a sampling technology can improve data training quality, reduce computing resource consumption, improve training efficiency, and resolve a problem of a data imbalance. Therefore, the sampling technology is critical. For example, in a recommendation system of the HUAWEI APPGALLERY, tens of billions of pieces of data are generated every day due to user operations. If no sampling technology is used during training of the tens of billions of pieces of data, the following problems may occur: (1) A large amount of data and excessive homogeneous data lead to quick overfitting of a trained model. (2) An excessively large data amount causes the following problems: a large quantity of hardware resources is consumed, model training is excessively slow, a model is not updated in time, and prediction accuracy of a model is reduced. (3) If a quantity of negative samples is far greater than a quantity of positive samples, a severe data imbalance is caused, and further, global classification performance of a model is affected.

In a scenario of a similar recommendation system, top N (the first N items) items that are presented generate most commercial values. How to consider top N ranking performance of a trained model in a sampling technology is a technical problem that is being researched by a person skilled in the art.

SUMMARY

Embodiments of the present disclosure disclose a recommendation model training method and a related apparatus, to improve performance of a trained model.

According to a first aspect, an embodiment of this application provides a recommendation model training method, where the method includes selecting a positive sample in a sample set, and adding the positive sample to a training set, where the sample set includes the positive sample and negative samples, each sample includes n sample features, $n \geq 1$, and the sample features of each sample include a feature used to represent whether the sample is a positive sample or a negative sample, where optionally, before this step, the sample set is stored in a database, and the positive sample in the sample set may be selected from the database, calculating sampling probabilities of the plurality of negative samples in the sample set by using a preset algorithm, where the preset algorithm is obtained based on one or more of a first rule, a second rule, and a third rule, where the first rule is that the sampling probability is negatively correlated with a score difference, the score difference is a difference between an estimated score of a positive sample in a sample set to which a current negative sample belongs and an estimated score of the current negative sample, and an estimated score of any sample is a parameter used to represent a positive/negative tendency of the any sample, the second rule is that the sampling probability is negatively correlated with a vector distance, the vector distance is a distance between an eigenvector of the positive sample in the sample set to which the current negative sample belongs and an eigenvector of the current negative sample, and the eigenvector of the positive sample is an n-dimensional vector including n sample features of the positive sample, and the third rule is that the sampling probability is positively correlated with a variation of an indicator, the variation of the indicator is generated after a ranking of the positive sample in the sample set to which the current negative sample belongs and a ranking of the current negative sample are exchanged, the ranking means ranking, based on the estimated scores, the samples in the sample set to which the current negative sample belongs, and the indicator is a ranking indicator of the samples in the sample set, selecting a negative sample from the sample set based on the sampling probability, and adding the negative sample to the training set, and performing training by using the samples in the training set, to obtain a recommendation model, where optionally, the recommendation model is stored, and optionally, the recommendation model is stored in a storage device.

In the foregoing method, the sampling probability of each negative sample is calculated, then, some negative samples are collected based on the sampling probabilities, and are added to the training set, and finally, a classification model is trained by using the training set, to generate a ranking list of objects described by the samples. When the sampling probability of the negative sample is calculated, a relationship between a negative sample and a positive sample (for example, relative values of estimated scores, a vector distance, and a variation of an indicator generated after rankings are exchanged) is fully considered, and a higher sampling probability is assigned to a negative sample that has a greater impact on model training as reflected in the relationship, so that there is a higher probability that the negative sample is considered in a classification model training process, to obtain a classification model with a better performance indicator.

In a possible implementation of the first aspect, the sample features of each sample include an object feature and a user feature, an input of the recommendation model during recommendation includes a feature of a target user and features of a plurality of to-be-recommended objects, an output of the recommendation model is one or more to-be-recommended objects in the plurality of to-be-recommended objects, and the one or more to-be-recommended objects are recommended to the target user.

In another possible implementation of the first aspect, the recommendation model is further used to generate an estimated score of a sample that is needed for training a new recommendation model next time. In other words, an estimated score of a sample is indirectly used in a classification model training process, and a trained classification model may in turn generate an estimated score of a sample for subsequent training of a new classification model. In this way, circular iteration can enable a classification model to quickly converge, thereby improving classification model training efficiency and ranking list generating performance.

In another possible implementation of the first aspect, objects described by sample features of all the samples in the sample set are objects presented in one recommendation result at a same time.

In another possible implementation of the first aspect, the adding a positive sample in each of a plurality of sample sets to a training set according to a preset rule includes adding all positive samples in each of the plurality of sample sets to the training set. Because a positive sample usually is a sample with high attention, fully considering such category of sample during training is equivalent to fully considering requirements of a majority of users, and a ranking list generated by using a classification model trained in such manner better meets a user requirement.

In another possible implementation of the first aspect, the selecting a negative sample from the sample set based on the sampling probability, and adding the negative sample to the training set includes dividing the sampling probabilities of the plurality of negative samples in the sample set by a reference value, to obtain corrected sampling probabilities of the plurality of negative samples, where the reference value is a maximum value in the sampling probabilities of the plurality of negative samples in the sample set, and successively comparing the corrected sampling probabilities of the plurality of negative samples in the sample set with a random number ranging from 0 to 1, and adding, to the training set, a negative sample whose corrected sampling probability is greater than the random number. In the manner using correction, the sampling probability of each negative sample is maximized without destroying a sampling probability distribution (that is, a relationship between relative values of the sampling probabilities of the negative samples remains unchanged). In this way, when a collected random number is compared with a corrected sampling probability, a sampling condition is more easily met, and sampling is performed more quickly, thereby greatly increasing a sampling probability.

According to a second aspect, an embodiment of this application provides a recommendation model training apparatus, where the apparatus includes a first sampling unit, configured to select a positive sample in a sample set, and add the positive sample to a training set, where the sample set includes the positive sample and negative samples, each sample includes n sample features, n≥1, and the sample features of each sample include a feature used to represent whether the sample is a positive sample or a negative sample, a second sampling unit, configured to calculate sampling probabilities of the plurality of negative samples in the sample set by using a preset algorithm, where the preset algorithm is obtained based on one or more of a first rule, a second rule, and a third rule, where the first rule is that the sampling probability is negatively correlated with a score difference, the score difference is a difference between an estimated score of a positive sample in a sample set to which a current negative sample belongs and an estimated score of the current negative sample, and an estimated score of any sample is a parameter used to represent a positive/negative tendency of the any sample, the second rule is that the sampling probability is negatively correlated with a vector distance, the vector distance is a distance between an eigenvector of the positive sample in the sample set to which the current negative sample belongs and an eigenvector of the current negative sample, and the eigenvector of the positive sample is an n-dimensional vector including n sample features of the positive sample, the third rule is that the sampling probability is positively correlated with a variation of an indicator, the variation of the indicator is generated after a ranking of the positive sample in the sample set to which the current negative sample belongs and a ranking of the current negative sample are exchanged, the ranking means ranking, based on the estimated scores, the samples in the sample set to which the current negative sample belongs, and the indicator is a ranking indicator of the samples in the sample set, and the second sampling unit is further configured to select a negative sample from the sample set based on the sampling probability, and add the negative sample to the training set, and a training unit, configured to perform training by using the samples in the training set, to obtain a recommendation model.

In the foregoing method, the apparatus calculates the sampling probability of each negative sample, then collects some negative samples based on the sampling probabilities and adds the negative samples to the training set, and finally trains a classification model by using the training set, to generate a ranking list of objects described by the samples. When the sampling probability of the negative sample is calculated, a relationship between a negative sample and a positive sample (for example, relative values of estimated scores, a vector distance, and a variation of an indicator generated after rankings are exchanged) is fully considered, and a higher sampling probability is assigned to a negative sample that has a greater impact on model training as reflected in the relationship, so that there is a higher probability that the negative sample is considered in a classification model training process, to obtain a classification model with a better performance indicator.

In a possible implementation of the second aspect, the sample features of each sample include an object feature and a user feature, an input of the recommendation model during recommendation includes a feature of a target user and features of a plurality of to-be-recommended objects, an output of the recommendation model is one or more to-be-recommended objects in the plurality of to-be-recommended objects, and the one or more to-be-recommended objects are recommended to the target user.

In a possible implementation of the second aspect, the recommendation model is further used to generate an estimated score of a sample that is needed for training a new recommendation model next time. In other words, an estimated score of a sample is indirectly used in a classification model training process, and a trained classification model may in turn generate an estimated score of a sample for subsequent training of a new classification model. In this way, circular iteration can enable a classification model to quickly converge, thereby improving classification model training efficiency and ranking list generating performance.

In another possible implementation of the second aspect, objects described by sample features of all the samples in the sample set are objects presented in one recommendation result at a same time.

In another possible implementation of the second aspect, that the first sampling unit is configured to add a positive sample in each of a plurality of sample sets to a training set according to a preset rule includes adding all positive samples in each of the plurality of sample sets to the training set. Because a positive sample usually is a sample with high attention, fully considering such category of sample during training is equivalent to fully considering requirements of a majority of users, and a ranking list generated by using a classification model trained in such manner better meets a user requirement.

In another possible implementation of the second aspect, that the second sampling unit selects a negative sample from the sample set based on the sampling probability, and adds the negative sample to the training set includes that the second sampling unit is configured to divide the sampling probabilities of the plurality of negative samples in the sample set by a reference value, to obtain corrected sampling probabilities of the plurality of negative samples, where the reference value is a maximum value in the sampling probabilities of the plurality of negative samples in the sample set, and successively compare the corrected sampling probabilities of the plurality of negative samples in the sample set with a random number ranging from 0 to 1, and add, to the training set, a negative sample whose corrected sampling probability is greater than the random number. In the manner using correction, the sampling probability of each negative sample is maximized without destroying a sampling probability distribution (that is, a relationship between relative values of the sampling probabilities of the negative samples remains unchanged). In this way, when a collected random number is compared with a corrected sampling probability, a sampling condition is more easily met, and sampling is performed more quickly, thereby greatly increasing a sampling probability.

In another possible implementation of the first aspect or another possible implementation of the second aspect, the preset algorithm is $p_j \propto \sum_i \frac{|\Delta z_{ij}|}{1 + \exp(s_i - s_j)} \|x_i - x_j\|$;

the preset algorithm is $p_j \propto \sum_i \frac{|\Delta z_{ij}|}{1 + \exp(s_i - s_j)}$;

the preset algorithm is $p_j \propto \sum_i \frac{\|x_i - x_j\|}{1 + \exp(s_i - s_j)}$; or the preset algorithm is $p_j \propto \sum_i |\Delta z_{ij}| * (s_j - s_i)$, where $p_j$ is a sampling probability of a $j^{th}$ negative sample in a first sample set, $s_i$ is an estimated score of an $i^{th}$ positive sample in the first sample set, $s_j$ is an estimated score of the $j^{th}$ negative sample in the first sample set, $x_i$ is an eigenvector of the $i^{th}$ positive sample in the first sample set, $x_j$ is an eigenvector of the $j^{th}$ negative sample in the first sample set, $|\Delta z_{ij}|$ is a variation, of an indicator, generated after rankings of the $i^{th}$ positive sample and the $j^{th}$ negative sample in the first sample set are exchanged, the first sample set is any one of a plurality of sample sets, and both i and j are positive integers.

The following conclusions may be drawn based on the foregoing formulas: 1. It can be learned, based on $\exp(s_i-s_j)$ in the foregoing formulas, that a higher estimated score of a negative sample indicates a higher estimated ranking and a higher sampling probability of the negative sample. 2. The sampling probability of the negative sample is related to both another negative sample and a positive sample, and this reflects a pairwise (a sample pair) idea and improves ranking performance of a final ranking list. 3. $\|x_i-x_j\|$ indicates that a larger distance between a negative sample and a positive sample indicates a higher sampling probability of the negative sample. 4. $|\Delta z_{ij}|$ enables a sampling probability of a negative sample, farther (which means a distance between rankings of estimated scores) away from a positive sample 503, to be higher.

According to a third aspect, an embodiment of the present disclosure provides a recommendation method, where the method includes obtaining a user feature and/or a feature of a to-be-recommended object, calculating an estimated score of each of a plurality of to-be-recommended objects based on the user feature and/or the feature of the to-be-recommended object and based on a recommendation model, where the recommendation model is obtained through training based on samples in a training set, the samples in the training set include a positive sample and a negative sample that are selected from a sample set, each sample includes n sample features, n≥1, the sample features of each sample include a feature used to represent whether the sample is a positive sample or a negative sample, the negative sample that is in the sample set and that is added to the training set is determined by using a sampling probability, the sampling probability of the negative sample is calculated by using a preset algorithm, and the preset algorithm is obtained based on one or more of a first rule, a second rule, and a third rule, where the first rule is that the sampling probability is negatively correlated with a score difference, the score difference is a difference between an estimated score of a positive sample in a sample set to which a current negative sample belongs and an estimated score of the current negative sample, and an estimated score of any sample is a parameter used to represent a positive/negative tendency of the any sample, the second rule is that the sampling probability is negatively correlated with a vector distance, the vector distance is a distance between an eigenvector of the positive sample in the sample set to which the current negative sample belongs and an eigenvector of the current negative sample, and the eigenvector of the positive sample is an n-dimensional vector including n sample features of the positive sample, and the third rule is that the sampling probability is positively correlated with a variation of an indicator, the variation of the indicator is generated after a ranking of the positive sample in the sample set to which the current negative sample belongs and a ranking of the current negative sample are exchanged, the ranking means ranking, based on the estimated scores, the samples in the sample set to which the current negative sample belongs, and the indicator is a ranking indicator of the samples in the sample set, ranking the plurality of to-be-recommended objects in descending order of the estimated scores, where optionally, the first M to-be-recommended objects in the rankings are stored in a storage device, and optionally, the first M to-be-recommended objects in the rankings are recommended to a target user, where M is a predefined positive integer.

In the foregoing method, when the sampling probability of the negative sample is calculated, a relationship between a negative sample and a positive sample (for example, relative values of estimated scores, a vector distance, and a variation of an indicator generated after rankings are exchanged) is fully considered, and a higher sampling probability is assigned to a negative sample that has a greater impact on model training as reflected in the relationship, so that there is a higher probability that the negative sample is considered in a classification model training process, to obtain a classification model with a better performance indicator. The estimated score that is of each to-be-recommended object and that is calculated by using such model is more accurate. Therefore, a recommended object obtained based on the estimated score better meets a user requirement.

In a possible implementation of the third aspect, the sample features of each sample include an object feature and a user feature, an input of the recommendation model during recommendation includes a feature of a target user and features of the plurality of to-be-recommended objects, an output of the recommendation model is one or more to-be-recommended objects in the plurality of to-be-recommended objects, and the one or more to-be-recommended objects are recommended to the target user.

In another possible implementation of the third aspect, the recommendation model is further used to generate an estimated score of a sample that is needed for training a new recommendation model next time. In other words, an estimated score of a sample is indirectly used in a classification model training process, and a trained classification model may in turn generate an estimated score of a sample for subsequent training of a new classification model. In this way, circular iteration can enable a classification model to quickly converge, thereby improving classification model training efficiency and ranking list generating performance.

In another possible implementation of the third aspect, objects described by sample features of all the samples in the sample set are objects presented in one ranking list (recommendation result) at a same time.

In another possible implementation of the third aspect, the preset algorithm is $p_j \propto \sum_i \frac{|\Delta z_{ij}|}{1 + \exp(s_i - s_j)} \|x_i - x_j\|$;

the preset algorithm is $p_j \propto \sum_i \frac{|\Delta z_{ij}|}{1 + \exp(s_i - s_j)}$;

the preset algorithm is $p_j \propto \sum_i \frac{\|x_i - x_j\|}{1 + \exp(s_i - s_j)}$; or the preset algorithm is $p_j \propto \sum_i |\Delta z_{ij}| * (s_j - s_i)$, where $p_j$ is a sampling probability of a $j^{th}$ negative sample in a first sample set, $s_i$ is an estimated score of an $i^{th}$ positive sample in the first sample set, $s_j$ is an estimated score of the $j^{th}$ negative sample in the first sample set, $x_i$ is an eigenvector of the $i^{th}$ positive sample in the first sample set, $x_j$ is an eigenvector of the $j^{th}$ negative sample in the first sample set, $|\Delta z_{ij}|$ is a variation of an indicator generated after rankings of the $i^{th}$ positive sample and the $j^{th}$ negative sample in the first sample set are exchanged, the first sample set is any one of the plurality of sample sets, and both i and j are positive integers.

The following conclusions may be drawn based on the foregoing formulas: 1. It can be learned, based on $\exp(s_i-s_j)$ in the foregoing formulas, that a higher estimated score of a negative sample indicates a higher estimated ranking and a higher sampling probability of the negative sample. 2. The sampling probability of the negative sample is related to both another negative sample and a positive sample, and this reflects a pairwise (a sample pair) idea and improves ranking performance of a final ranking list. 3. $\|x_i-x_j\|$ indicates that a larger distance between a negative sample and a positive sample indicates a higher sampling probability of the negative sample. 4. $|\Delta z_{ij}|$ enables a sampling probability of a negative sample, farther (which means a distance between rankings of estimated scores) away from a positive sample 503, to be higher.

According to a fourth aspect, an embodiment of this application provides a recommendation model training apparatus. The apparatus includes one or more processors and one or more memories, the one or more memories are configured to store a program instruction, and when invoking the program instruction, the one or more processors implement the recommendation model training method described in any one of the first aspect or the possible implementations of the first aspect. Optionally, the training apparatus may be a training device described subsequently. Optionally, a recommendation model is stored in the one or more memories.

According to a fifth aspect, an embodiment of this application provides a recommendation apparatus. The apparatus includes one or more processors and one or more memories, the memory is configured to store a program instruction, and when invoking the program instruction, the one or more processors implement the recommendation method described in any one of the third aspect or the possible implementations of the third aspect. Optionally, a recommendation result is stored in the one or more memories.

Optionally, the recommendation apparatus may be an execution device described subsequently.

According to a sixth aspect, an embodiment of this application provides a computer-readable storage medium. The computer-readable storage medium stores an instruction. When the instruction is run on a processor, the recommendation model training method described in any one of the first aspect or the possible implementations of the first aspect is implemented.

According to a seventh aspect, an embodiment of this application provides a computer-readable storage medium. The computer-readable storage medium stores an instruction. When the instruction is run on a processor, the recommendation method described in any one of the third aspect or the possible implementations of the third aspect is implemented.

According to an eighth aspect, an embodiment of this application provides a computer program product. When the computer program product is run on a processor, the recommendation model training method described in any one of the first aspect or the possible implementations of the first aspect is implemented.

According to a ninth aspect, an embodiment of this application provides a computer program product. When the computer program product is run on a processor, the recommendation method described in any one of the third aspect or the possible implementations of the third aspect is implemented.

BRIEF DESCRIPTION OF DRAWINGS

The following describes the accompanying drawings used in the embodiments of the present disclosure.

DESCRIPTION OF EMBODIMENTS

The following describes the embodiments of the present disclosure with reference to the accompanying drawings in the embodiments of the present disclosure.

Figure 1A:
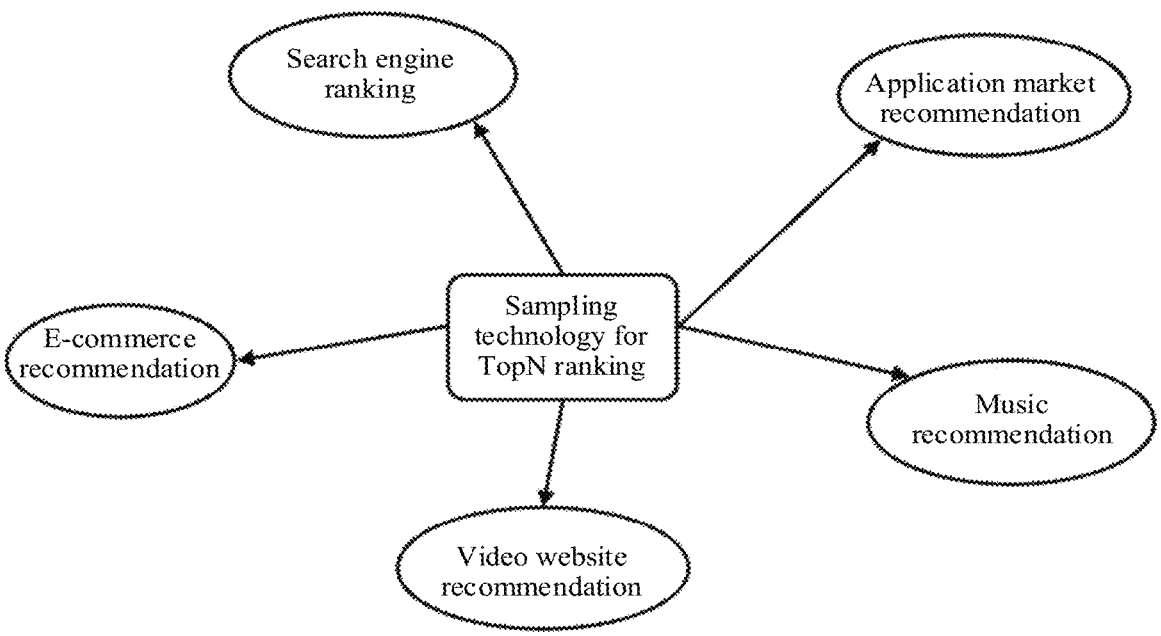
FIG. 1A is a schematic diagram of an application scenario of machine learning according to an embodiment of the present disclosure.
Figure 1B:
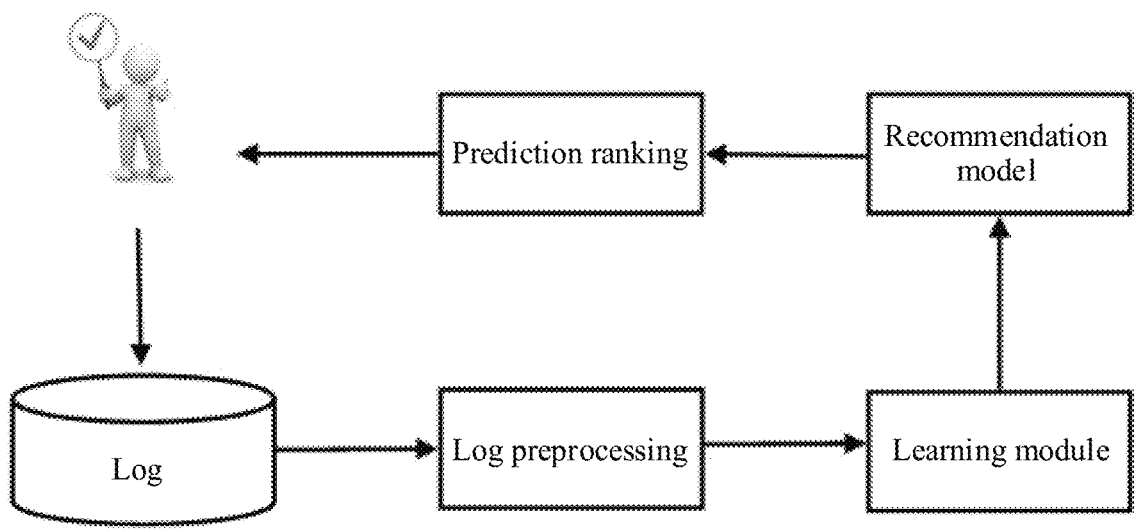
FIG. 1B is a schematic flowchart of a recommendation method according to an embodiment of the present disclosure.

Currently, there are many machine learning scenarios concerning top N (the first N items) ranking. As shown in FIG. 1A, the scenario includes but is not limited to scenarios related to e-commerce product recommendation, search engine result recommendation, application market recommendation, music, application (APP) recommendation, and video website recommendation, and items recommended in various different application scenarios are referred to as "objects" below for ease of subsequent description. Such machine learning scenario concerning top N ranking usually involves steps such as user behavior log collection, log data preprocessing (for example, quantization and sampling), sample learning to obtain a recommendation model, ranking objects (for example, APPs and music) in samples based on the recommendation model, presenting a ranking result to a user, and performing, by the user, an operation on a ranked object to generate a user behavior log. For details, refer to FIG. 1B. An embodiment of this application provides a recommendation model training method, to optimize a sample sampling process in the foregoing steps, thereby optimizing a sampling policy, improving training efficiency, and enabling a recommendation result of a recommendation system to better meet a user requirement.

Figure 2A:
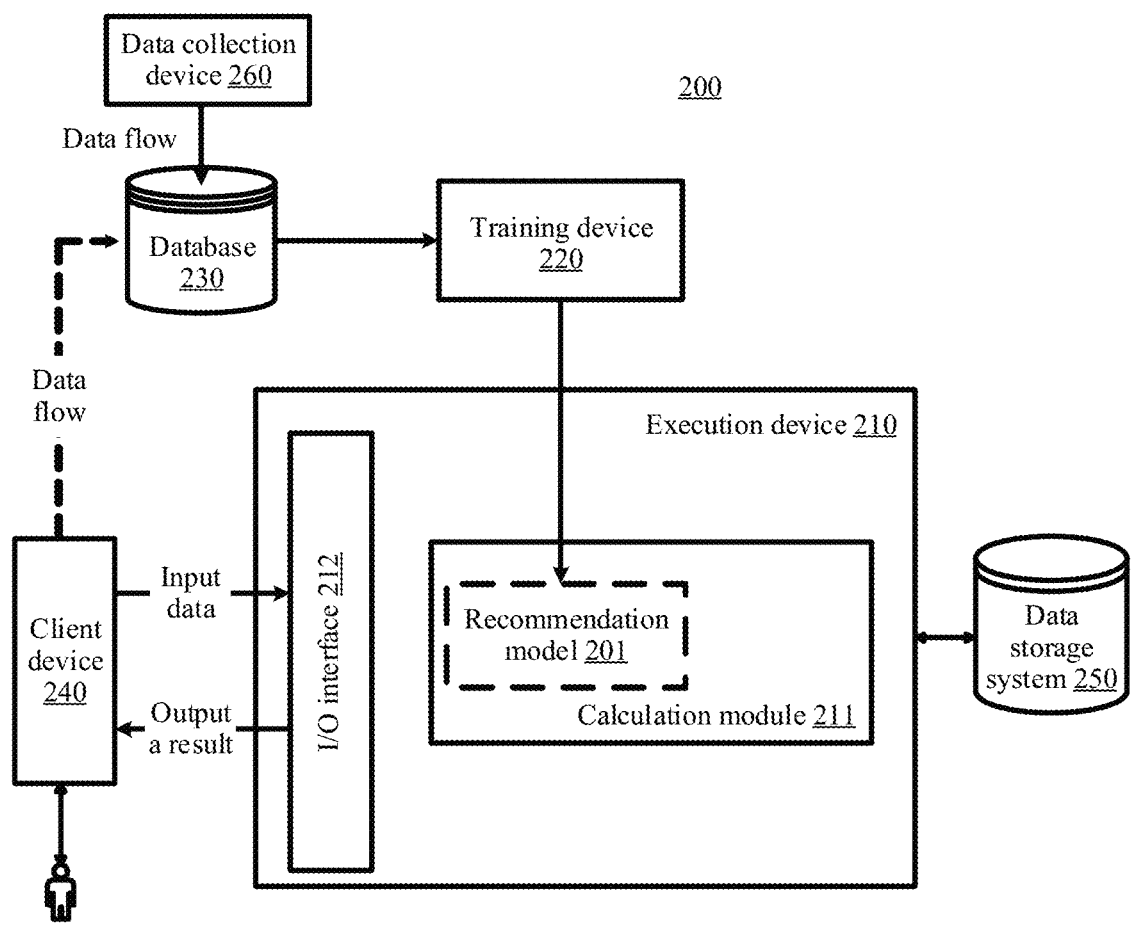
FIG. 2A is a schematic diagram of a system architecture according to an embodiment of the present disclosure.

Referring to FIG. 2A, an embodiment of the present disclosure provides a system architecture 200. A data collection device 260 is configured to collect a sample. One training sample may include a plurality of pieces of feature information. There may be a plurality of types of feature information. The feature information may include user feature information, object feature information, and a label feature. The user feature information is used to represent a feature of a user, for example, gender, an age, an occupation, or a hobby. The object feature information is used to represent a feature of an object pushed to the user. Different recommendation systems correspond to different objects, and types of features that need to be extracted for different objects are also different. For example, an object feature extracted from a training sample of an APP market may be a name (identifier), a type, a size, or the like of an APP. An object feature extracted from a training sample of an e-commerce APP may be a name, a category, a price range, or the like of a product. The label feature is used to indicate whether the sample is a positive sample or a negative sample. Generally, a label feature of a sample may be obtained based on information about an operation performed by the user on a recommended object. A sample in which the user performs an operation on a recommended object is a positive sample, and a sample in which the user performs no operation on a recommended object is a negative sample. For example, when the user clicks, downloads, or purchases the recommended object, the label feature is 1, indicating that the sample is a positive sample, and if the user does not perform any operation on the recommended object, the label feature is 0, indicating that the sample is a negative sample. The sample may include user feature information, object feature information, and a sample type identifier. After the sample is collected, the sample may be stored in a database 230. Some or all feature information, for example, user feature information and information about an operation that the user performs on an object (used to determine a type identifier), of the sample in the database 230 may be directly obtained from a client device 240. A training device 220 generates a recommendation model 201 through training based on the sample in the database 230. The following describes in more detail how the training device 220 obtains the recommendation model 201 based on sample training. The recommendation model 201 can evaluate a large quantity of objects to obtain a recommendation result, for example, recommend 10 objects to the user from a large quantity of objects.

In this embodiment of this application, the training device 220 may select a positive sample from a sample set in the database 230, add the positive sample to a training set, calculate sampling probabilities of a plurality of negative samples or a sampling probability of each negative sample in the sample set, then select, based on the sampling probability, a negative sample meeting a condition and add the negative sample to the training set, and then perform training by using the samples in the training set, to obtain a recommendation model. For implementation details of a calculation module 211, refer to the detailed descriptions of the method embodiment in FIG. 3A.

After obtaining the recommendation model 201 based on sample training, the training device 220 sends the recommendation model 201 to an execution device, to make recommendation for a corresponding system. For example, a recommendation model obtained based on video-related sample training may be used to recommend a video to a user on a video website or APP, and a recommendation model obtained based on APP-related sample training may be used to recommend an APP to a user in an application market.

The execution device 210 is provided with an input/output (I/O) interface 212, to exchange data with an external device. The execution device 210 may obtain user feature information such as a user identifier, a user identity, gender, an occupation, and a hobby from the client device 240 by using the I/O interface 212, and the information may be alternatively obtained from a system database. The recommendation model 201 recommends a target recommended object to a user based on the user feature information and feature information of to-be-recommended objects. The execution device 210 may be disposed on a cloud server, or may be disposed on a user client.

A data storage system 250 is configured to receive and store a parameter of the recommendation model sent by the training device, is configured to store data of a recommendation result obtained by using the recommendation model, and certainly may further include program code (or an instruction) needed for normal running of the storage system 250. The data storage system 250 may be one device that is deployed outside the execution device 210 or a distributed storage cluster including a plurality of devices that are deployed outside the execution device 210. In this case, when the execution device 210 needs to use the data in the storage system 250, the storage system 250 may send the data needed by the execution device to the execution device 210. Correspondingly, the execution device 210 receives and stores (or temporarily buffers) the data. Certainly, the data storage system 250 may be alternatively deployed on the execution device 210. When deployed on the execution device 210, the distributed storage system may include one or more memories. Optionally, when there is a plurality of memories, different memories are configured to store different types of data, for example, the model parameter of the recommendation model generated by the training device and the data of the recommendation result obtained by using the recommendation model may be separately stored in two different memories.

The calculation module 211 processes the user feature information and the feature information of the to-be-recommended objects by using the recommendation model 201. For example, the calculation module 211 performs calculation based on the user feature information and the feature information of the to-be-recommended objects and by using the recommendation model 201, to obtain rankings of the to-be-recommended objects. A highly ranked object is used as an object recommended to the client device 240.

Finally, the I/O interface 212 returns the recommendation result to the client device 240, and presents the recommendation result to the user.

Furthermore, the training device 220 may generate corresponding recommendation models 201 for different targets based on different sample feature information, to provide a better result for the user.

It should be noted that FIG. 2A is merely a schematic diagram of the system architecture provided in this embodiment of the present disclosure, and a location relationship between devices, components, modules, and the like in the figure does not constitute any limitation. For example, in FIG. 2A, the data storage system 250 is an external memory relative to the execution device 210. In another case, the data storage system 250 may be alternatively disposed on the execution device 210.

In this embodiment of this application, the training device 220, the execution device 210, and the client device 240 may be three different physical devices, or the training device 220 and the execution device 210 may be on a same physical device or one cluster, or the execution device 210 and the client device 240 may be on a same physical device or one cluster.

Figure 2B:
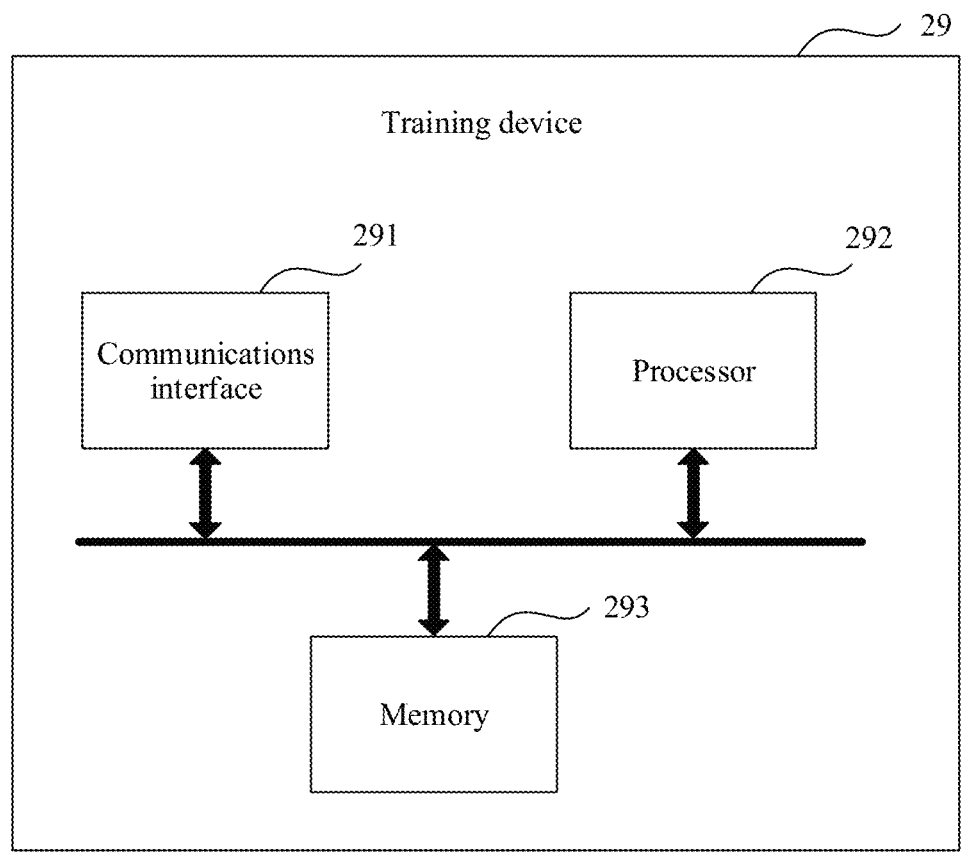
FIG. 2B is a schematic structural diagram of a training device according to an embodiment of the present disclosure.

An apparatus in the recommendation model training method in the embodiments of this application is the training device (the training device is one server or a cluster including several servers). The following briefly describes a structure of the training device by using an example in which the training device is one server. FIG. 2B is a schematic structural diagram of a training device 29 according to an embodiment of the present disclosure. The training device 29 includes a processor 291, a memory 292, and a communications interface 293. The processor 291, the memory 292, and the communications interface 293 are connected to each other by using a bus.

The communications interface 293 is configured to obtain sample data. For example, after collecting data generated when a user operates an application market, another device sends the data to the training device by using a network, a data cable, or another method. Correspondingly, the training device receives the data by using the communications interface 293, to obtain a sample. The sample may be stored in the memory 292.

The memory 292 includes but is not limited to a random-access memory (RAM), a read-only memory (ROM), an erasable programmable ROM (EPROM), or a compact disc (CD) ROM (CD-ROM). The memory 292 is configured to store a related program instruction and store related data. The related data may include data (for example, the sample) obtained by using the communications interface 293 and a parameter of a trained recommendation model. The memory 292 may be one memory or a plurality of memories. Optionally, when there is a plurality of memories, different memories are configured to store different types of data. For example, sample data used for training a recommendation model and a recommendation model obtained through training by using the sample data are separately stored in two different memories. As shown in FIG. 2B, the memory 292 is disposed on the training device 29. Actually, a storage function may be alternatively provided for the training device 29 by a storage system that is deployed outside the training device 29. For example, the storage system may be one device or a distributed storage cluster including a plurality of devices. In this case, when the training device 29 needs to use data in the storage system, the storage system may send the needed data to the training device 29. Correspondingly, the training device 29 receives and stores (or temporarily buffers) the data.

The processor 291 may be one or more central processing units (CPUs). When the processor 291 is one CPU, the CPU may be a single-core CPU, or may be a multi-core CPU. The processor 291 is configured to read a program stored in the memory 292 and execute the program, to perform related operations in the recommendation model training method in FIG. 3A, for example, a sample collection operation and a model training operation. In addition, the processor may be a dedicated processor or a general purpose processor.

Optionally, the training device 29 may further include an output component, for example, a display or a sound. The output component is configured to present, to a developer, parameters to be used for model training. Therefore, the developer may learn the parameters, or may modify the parameters and input modified parameters into the training device 29 by using an input component (for example, a mouse or a keyboard). In addition, the training device 29 may further present a trained recommendation model to the developer by using the output component.

Figure 2C:
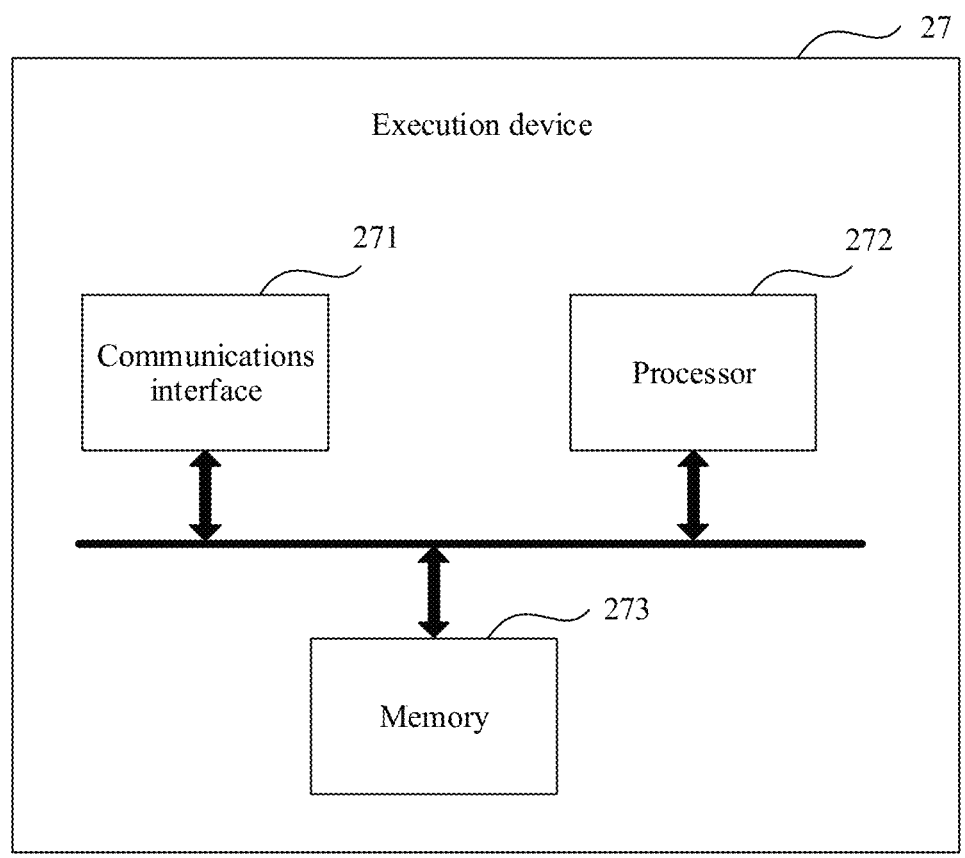
FIG. 2C is a schematic structural diagram of an execution device according to an embodiment of the present disclosure.

In this embodiment of this application, after the recommendation model is trained, the recommendation model is used by an execution device 27. The execution device 27 is one server or a cluster including several servers. The following briefly describes a structure of the execution device by using an example in which the execution device 27 is one server. FIG. 2C is a schematic structural diagram of an execution device 27 according to an embodiment of the present disclosure. The execution device 27 includes a processor 271, a memory 272, and a communications interface 273. The processor 271, the memory 272, and the communications interface 273 are connected to each other by using a bus.

The communications interface 273 is configured to obtain a parameter of the recommendation model. For example, the communications interface 273 sets up a communication connection to the training device, and therefore can receive the parameter of the recommendation model sent by the training device. The parameter of the recommendation model may be stored in the memory 272 for invoking.

The memory 272 includes but is not limited to a RAM, a ROM, an EPROM, or a portable ROM (e.g., CD-ROM). The memory 272 is configured to store a related program instruction and store related data. The related data may include the parameter of the recommendation model obtained by using the communications interface 273 and result data that is obtained after recommendation of the recommendation model. The memory 272 may be one memory or a plurality of memories. Optionally, when there is a plurality of memories, different memories are configured to store different types of data. For example, the model parameter of the recommendation model and a recommendation result that is obtained by using the recommendation model are separately stored in two different memories. As shown in FIG. 2C, the memory 272 is disposed on the execution device 27. Actually, a storage function may be alternatively provided for the execution device 27 by a storage system that is deployed outside the training device. For example, the storage system is the storage system 250 mentioned above.

The processor 271 may be one or more CPUs. When the processor 271 is one CPU, the CPU may be a single-core CPU, or may be a multi-core CPU. The processor 271 is configured to read a program stored in the memory 272 and execute the program, to perform a related operation in the recommendation method in FIG. 3B. In addition, the processor may be a dedicated processor or a general purpose processor.

Optionally, the execution device 27 may further include an output component, for example, a display or a sound. The output component is configured to present, to a user, the recommendation result obtained by using the recommendation model.

Figure 3A:
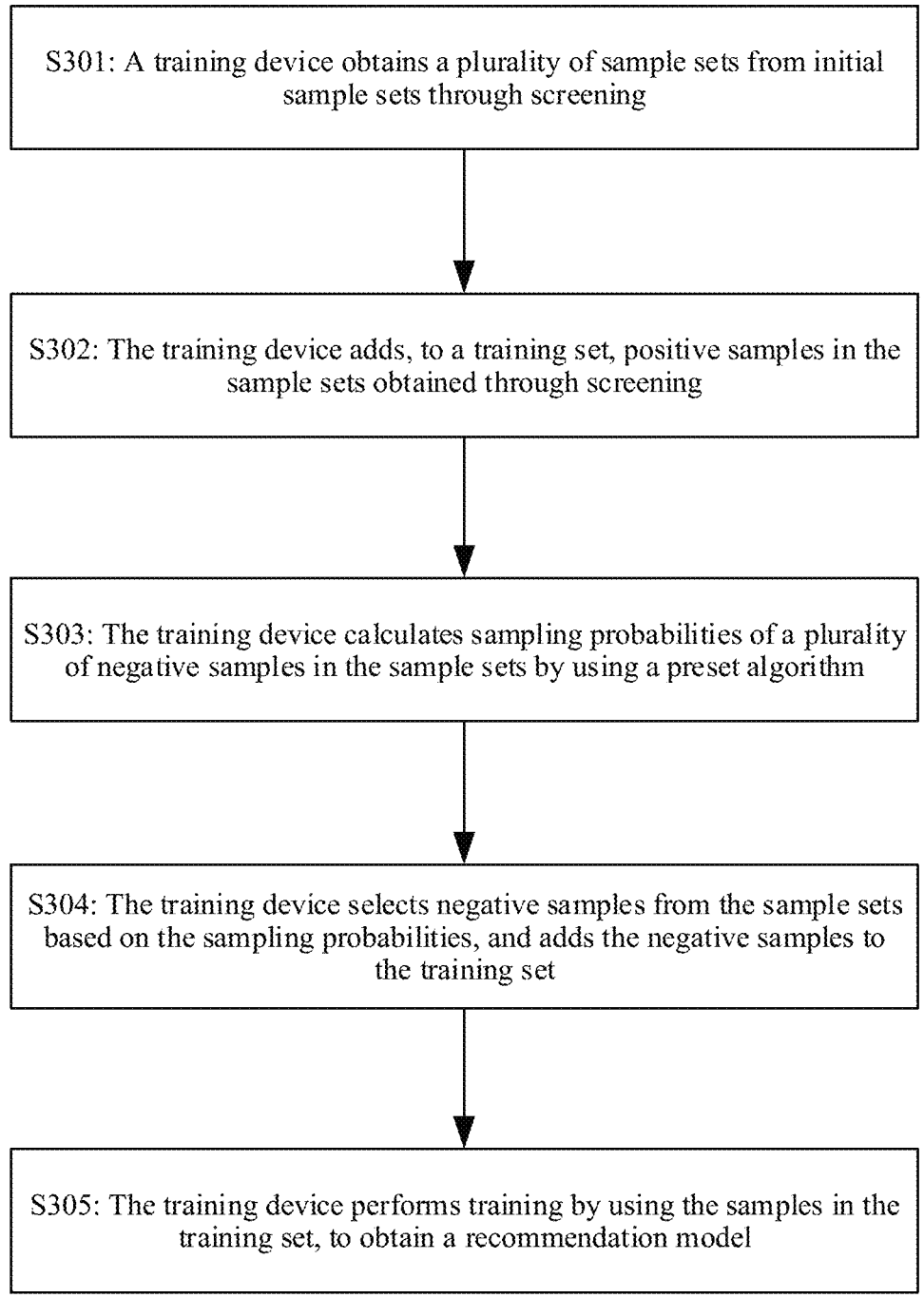
FIG. 3A is a schematic flowchart of a recommendation model training method according to an embodiment of the present disclosure.

FIG. 3A shows a recommendation model training method according to an embodiment of the present disclosure. The method may be implemented based on the training device 29 in FIG. 2B, or may be implemented based on another architecture. The method includes but is not limited to the following steps.

Step S301: The training device obtains a plurality of sample sets from initial sample sets through screening.

Further, there are a plurality of initial sample sets, and each sample set includes one or more samples. The training device obtains, through screening from the plurality of samples sets, sample sets each including at least one positive sample, and the sample sets that are obtained through screening are referred to as a plurality of sample sets for ease of subsequent description. In this way, a large quantity of low-valued samples can be preliminarily screened out, to reduce subsequent calculation pressure. Processing a sample set mentioned in a subsequent step refers to processing a sample set obtained through screening.

In this embodiment of this application, for each of the plurality of sample sets, sample features of each sample in the sample set include a feature used to describe an object, namely, object feature information mentioned above. Optionally, objects described by sample features of all the samples in the sample set are objects presented in one ranking list at a same time. For example, a sample set includes a sample 1, a sample 2, and a sample 3. The sample 1 includes a feature used to describe an object 1, the sample 2 includes a feature used to describe an object 2, and the sample 3 includes a feature used to describe an object 3. The object 1, the object 2, and the object 3 are three objects presented in a same ranking list at a same time. For ease of understanding, "the objects displayed in the same ranking list at a same time" are described by way of example. When you open a home page of Youku, a "movie ranking list", a "teleplay ranking list", and the like are displayed on the home page. The "movie ranking list" and the "teleplay ranking list" are different ranking lists. The ranking lists are displayed when a user uses the home page of Youku a previous day and the ranking lists are also displayed when the user uses the home page of Youku a current day. The ranking lists displayed the previous day and the ranking lists displayed the current day are ranking lists displayed at different times.

Optionally, feature information of the object may include one or more of an object identifier (ID), an ID of a video ranking list to which the object belongs, an object name, an object introduction, an object size, a label of the object, a comment on the object, and the like. Certainly, the feature information of the object may not include the information listed herein but includes other attribute information of the object.

In this embodiment of this application, for each of the plurality of sample sets, sample features of each sample in the sample set include a feature used to describe a user, namely, user feature information mentioned above. The user feature information may include one or more of a user ID, user gender, an age, an occupation, an income, a hobby, an education status, and the like. Certainly, the user feature information may not include the information listed herein but includes other information describing a user feature.

Figure 4:
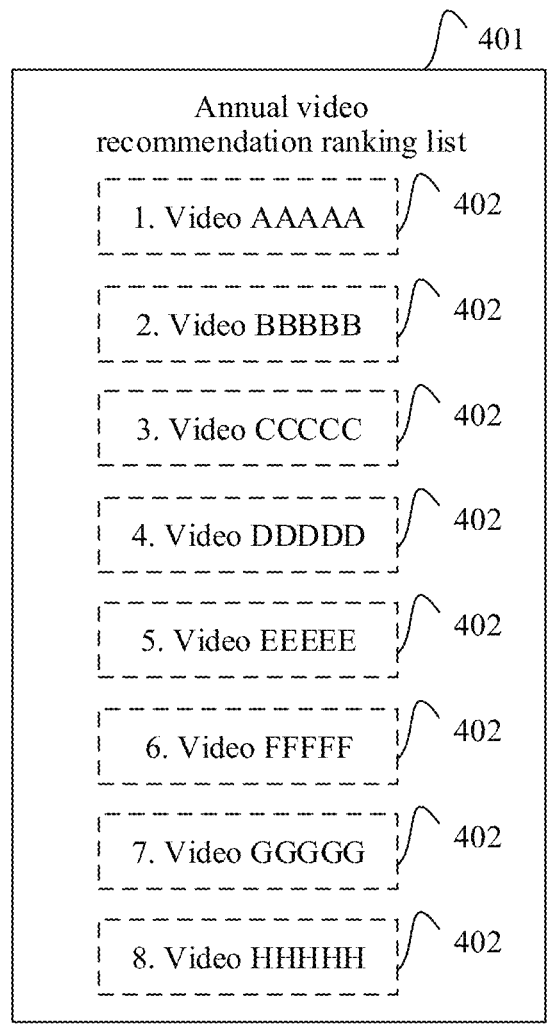
FIG. 4 is a schematic scenario diagram of a video ranking list according to an embodiment of the present disclosure.

In this embodiment of this application, for each of the plurality of sample sets, sample features of each sample in the sample set include a feature used to describe whether the sample is a positive sample or a negative sample, namely, a sample type identifier. Whether a sample is a positive sample or a negative sample may be identified by using a sample type identifier of the sample. For example, when a sample type identifier of a sample is 1, it indicates that the sample is a positive sample, and when a sample type identifier of a sample is 0, it indicates that the sample is a negative sample. A sample type identifier of a sample is determined by information about an operation performed by a user on an object described by a feature of the sample. For example, the operation information is used to indicate operations such as "browse", "download", "comment", and "purchase", and the different operation information indicates different sample type identifiers. For example, the following content is predefined when an operation is "browse", a sample type identifier is used to mark a negative sample, and when an operation behavior is "download", a sample type identifier is used to mark a positive sample. During actual application, which operation corresponds to a positive sample and which operation corresponds to a negative sample may be predefined. FIG. 4 shows a video ranking list 401. Several videos 402 (namely, ranked objects) are ranked in the ranking list. From when a user enters an interface of the video ranking list 401 to when the user leaves the interface of the video ranking list 401, information about an operation (for example, browse or download) performed by the user on each video 402 in the video ranking list 401 is recorded. In this case, object feature information included in one sample may include a video ID of one video 402, an ID of the video ranking list to which the video belongs, a video name, a video provider, a video type, a video size, a label, a score, a comment, and the like, user feature information included in the sample may include a user ID, user gender, an age, an occupation, an income, a hobby, an education status, and the like, and a sample type identifier included in the sample may be "download", used to indicate that the sample is a positive sample (the following content is predefined "download" indicates a positive sample, and "browse" indicates a negative sample, where a value 1 may be configured to represent "download", and a value 0 may be configured to represent "browse").

Each of the foregoing plurality of sample sets has an identifier (ID), and each sample set includes a plurality of samples. For example, an $m^{th}$ sample in a sample set A may be represented as:

$x_m = \{t_1, t_2, t_3, t_4, \ldots, t_n, \ldots, t_N\}$, where $t_n$ represents an $n^{th}$ feature of the $m^{th}$ sample.

For example, if a user whose identity is U1 downloads a video (namely, an object) whose identifier is video 1 (name), a video type of video 1 is horror movie, gender of the user U1 is male, an age is 25, an occupation is software engineer, and a hobby is gunfight movie, a sample {1, U1, male, 25, software engineer, gunfight, video 1} can be obtained. The first item "1" indicates that an operation behavior is "download", and a sample corresponding to the operation behavior "download" is a positive sample. Therefore, it can be identified, by using the first item in the sample, whether the sample is a positive sample or a negative sample. If the sample is an $n^{th}$ sample in a sample set whose identifier is m, a relationship is as follows:

$x_m = \{1, U1, \text{male}, 25, \text{software engineer}, \text{gunfight}, \text{video 1}, \text{horror movie}\}$.

When a recommendation scenario is another scenario, for example, APP recommendation in an APP application market, operation information for determining a positive/negative sample may be similar to that in the foregoing scenario, and a user feature may also be similar to the foregoing example. Object feature information included in a sample may include an ID of an APP, an ID of a recommended ranking list to which the APP belongs, an APP name, an APP provider, an APP type, an APP size, a label, a score, a comment, and the like.

Step S302: The training device adds, to a training set, positive samples in the sample sets obtained through screening.

Further, how to select the positive samples from the sample sets obtained through screening and add the positive samples to the training set is specified in a preset rule. Optionally, all positive samples in each sample set may be added to the training set. Optionally, some positive samples in each sample set may be added to the training set. For example, a proportion of positive samples in the training set and a total quantity of samples needed by the training set are pre-specified. In this way, a quantity of needed positive samples can be calculated, and then, the needed positive samples are selected from the plurality of sample sets according to a defined policy, and are added to the training set.

Step S303: The training device calculates sampling probabilities of a plurality of negative samples in the sample sets by using a preset algorithm.

Further, the preset algorithm is obtained based on one or more of a first rule, a second rule, and a third rule, and the plurality may include two or three. The first rule, the second rule, and the third rule are separately described below.

The first rule is that the sampling probability is negatively correlated with a score difference, and the score difference is a difference between an estimated score of a positive sample in a sample set to which a current negative sample belongs and an estimated score of the current negative sample. For example, it is assumed that a sampling probability of a $j^{th}$ negative sample needs to be calculated, and a sample set to which the $j^{th}$ negative sample belongs is referred to as a first sample set. Then, the score difference may be represented as $(s_i - s_j)$, where $s_i$ is an estimated score of an $i^{th}$ positive sample in the first sample set, and $s_j$ is an estimated score of the $j^{th}$ negative sample. Optionally, if the first sample set includes N positive samples, i is sequentially set to each positive integer from 1 to N, and one score difference can be calculated each time i is set to one value. Therefore, N score differences are finally obtained, and any score difference is negatively correlated with the sampling probability. In this embodiment of this application, an estimated score of any sample is a parameter that is estimated by using a model and that is used to represent a positive/negative tendency of the any sample. The model herein may be obtained through training by using a large quantity of historical samples (each sample carries a label indicating that the sample is a positive sample or a label indicating that the sample is a negative sample). Therefore, the model may estimate an input sample to obtain an estimated score. The estimated score can reflect whether the input sample is (or tends to be) a positive sample or a negative sample. Both i and j are positive integers. According to the first rule, an estimated score of a negative sample is low in an ideal state. If an estimated score of a negative sample is very high, it indicates that the score is inaccurately estimated, and it reflects that the negative sample is not fully considered in a normal sample training process. Therefore, it is more necessary to consider the negative sample during subsequent training. Therefore, a higher sampling probability is configured for such negative sample according to the first rule, so that there is a higher possibility that the negative sample is subsequently collected into the training set. Therefore, precision of a finally trained model is higher.

The following describes a score difference by way of example with reference to Table 1. It is assumed that samples in the first sample set are all generated based on operations performed by a user on videos, and the first sample set includes samples $x_1$, $x_2$, $x_3$, $x_4$, and $x_5$. The samples, estimated scores corresponding to the samples, rankings of the estimated scores, and sample types are shown in Table 1:

TABLE 1

| Sample | Estimated score | Rankings | Sample type |
|---|---|---|---|
| $x_1$ = {1, U1, male, 25, software engineer, gunfight, video 1, horror movie} | $s_1$ = 4.7 | 1 | Positive sample |
| $x_2$ = {1, U1, male, 25, software engineer, gunfight, video 5, comedy} | $s_2$ = 4.1 | 2 | Positive sample |
| $x_3$ = {0, U1, male, 25, software engineer, gunfight, video 7, horror movie} | $s_3$ = 3.8 | 3 | Negative sample |
| $x_4$ = {0, U1, male, 25, software engineer, gunfight, video 9, comedy} | $s_4$ = 3.0 | 4 | Negative sample |
| $x_5$ = {0, U1, male, 25, software engineer, gunfight, video 3, idol} | $s_5$ = 2.1 | 5 | Negative sample |

It can be learned from Table 1 that if a sampling probability of a negative sample $x_3$ needs to be calculated, an estimated score $s_3$ of the negative sample $x_3$ needs to be subtracted from an estimated score $s_1$ of a positive sample $x_1$ to obtain a score difference, namely, $(s_1 - s_3)$, and the estimated score $s_3$ of the negative sample $x_3$ needs to be subtracted from an estimated score $s_2$ of a positive sample $x_2$ to obtain a score difference, namely, $(s_2 - s_3)$, where the sampling probability of the negative sample $x_3$ is negatively correlated with both the score difference $(s_1 - s_3)$ and the score difference $(s_2 - s_3)$. Similarly, if a sampling probability of a negative sample $x_4$ needs to be calculated, an estimated score $s_4$ of the negative sample $x_4$ needs to be subtracted from the estimated score $s_1$ of the positive sample $x_1$ to obtain a score difference, namely, $(s_1 - s_4)$, and the estimated score $s_4$ of the negative sample $s_4$ needs to be subtracted from the estimated score $s_2$ of the positive sample $x_2$ to obtain a score difference, namely, $(s_2-s_4)$, where the sampling probability of the negative sample $x_4$ is negatively correlated with both the score difference $(s_1-s_4)$ and the score difference $(s_2-s_4)$. A principle of calculating a sampling probability of a negative sample $x_5$ is the same as the principle of calculating the sampling probability of the negative sample $x_3$ and the sampling probability of the negative sample $x_4$, and details are not described herein again.

The second rule is that the sampling probability is negatively correlated with a vector distance, the vector distance is a distance between an eigenvector of the positive sample in the sample set to which the current negative sample belongs and an eigenvector of the current negative sample, and the eigenvector of each sample is an n-dimensional vector including n sample features of the sample. For example, it is assumed that a sampling probability of a $j^{th}$ negative sample needs to be calculated, and a sample set to which the $j^{th}$ negative sample belongs is referred to as a first sample set. Then, the vector distance may be represented as $\|x_i-x_j\|$, where $x_i$ is an eigenvector of an $i^{th}$ positive sample in the first sample set, $x_j$ is an eigenvector of the $j^{th}$ negative sample, and both i and j are positive integers. A negative sample farther away from a positive sample has fewer features similar to those of the positive sample. In other words, a negative sample farther away from a positive sample carries more new (relative to the positive sample) features. Generally, more extensive features need to be considered during training, to improve precision of a trained model. Therefore, in this embodiment of this application, the sampling probability is configured to be negatively correlated with the vector distance, so that a negative sample farther away from a positive sample has a higher sampling probability. In this way, there is a higher probability that a negative sample farther away from a positive sample is sampled into the training set, to improve precision of a finally trained model.

It can be learned from Table 1 that if i=2 and j=3, the following information can be determined:

$x_i$={1, U1, male, 25, software engineer, gunfight, video 5, comedy}, and $x_j$={0, U1, male, 25, software engineer, gunfight, video 7, horror movie}.

The eigenvectors $x_i$ and $x_j$ may be considered as two coordinates in an 8-dimensional coordinate system, and the vector distance $\|x_i-x_j\|$ is equivalent to a distance between the two coordinates in the 8-dimensional coordinate system. Optionally, in this embodiment of this application, a mapping relationship between a user and a value, a mapping relationship between gender and a value, a mapping relationship between an age and a value, a mapping relationship between an occupation and a value, a mapping relationship between a hobby and a value, and a mapping relationship between a video and a value may be pre-established. Then, quantization is completed after text features of $x_i$ and $x_j$ are mapped to values, and the quantized $x_i$ and $x_j$ can be considered as coordinates in the 8-dimensional coordinate system.

The third rule is that the sampling probability is positively correlated with a variation of an indicator, and the variation of the indicator is generated after a ranking of the positive sample in the sample set to which the current negative sample belongs and a ranking of the current negative sample are exchanged. The ranking is ranking, based on estimated scores, the samples in the sample set to which the current negative sample belongs, and the indicator is used to measure an effect of a ranking list generated for objects described by samples in each of the plurality of sample sets. For example, the indicator may be NDCG@5 (top 5 based on a normalized discounted cumulative gain), NDCG@10 (top 10 based on a normalized discounted cumulative gain), P@5 (top 5 based on precision), and P@10 (top 10 based on precision). The estimated score has been described in the first rule, and a sequence is obtained after the estimated scores are ranked. It is assumed that a sampling probability of a $j^{th}$ negative sample needs to be calculated, and a sample set to which the $j^{th}$ negative sample belongs is referred to as a first sample set. After samples in the first sample set are ranked based on estimated scores, the $j^{th}$ negative sample has a ranking in the rankings, and an $i^{th}$ positive sample in the first sample set also has a ranking in the rankings. Before the rankings of the $j^{th}$ negative sample and the $i^{th}$ positive sample are exchanged, first, the following operations are simulated in this arrangement manner sampling, training a model, and generating, based on the model, a ranking list (a simulated ranking list is used for calculation rather than presentation to a user) of objects described by samples in each of the plurality of sample sets. In this case, the ranking list has an indicator value, namely, a ranking indicator. The ranking indicator is an indicator used to represent pros and cons of a ranking result of the current ranking list. Then, the rankings of the $j^{th}$ negative sample and the $i^{th}$ positive sample are exchanged, and the following operations are simulated in this arrangement manner after the rankings are exchanged: sampling, training a recommendation model (for example, the model may be trained by using an incremental learning algorithm (follow the regularized leader (FTRL)), optimized logistic regression (LR), or a field-aware factorization machine (FFM), or another algorithm), and generating, based on the recommendation model, a ranking list (a simulated ranking list is used for calculation rather than presentation to a user) of objects described by samples in each of the plurality of sample sets. In this case, the ranking list has an indicator value. The variation of the indicator $|\Delta z_{ij}|$ can be obtained after a subtraction operation is performed on the two calculated indicator values.

It can be learned from Table 1 that if the $i^{th}$ positive sample is $x_2$, and the $j^{th}$ negative sample is $x_3$, the estimated score of the $i^{th}$ positive sample $x_i$ is ranked the second, and the estimated score of the $j^{th}$ negative sample is ranked the third. In this embodiment of this application, a ranking indicator $z_{ij\_1}$ generated when the first sample set is in a state shown in Table 1 is calculated through simulation, and then, positions (positions of estimated scores, the rankings, or the like remain unchanged) of the positive sample $x_2$ and the negative sample $x_3$ in the first sample set are exchanged, to obtain a first sample set after the positions are exchanged, as shown in Table 2:

TABLE 2

| Sample | Estimated score | Rankings | Sample type |
|---|---|---|---|
| $x_1$ = {1, U1, male, 25, software engineer, gunfight, video 1, horror movie} | $s_1$ = 4.7 | 1 | Positive sample |
| $x_3$ = {0, U1, male, 25, software engineer, gunfight, video 7, horror movie} | $s_2$ = 4.1 | 2 | Positive sample |
| $x_2$ = {1, U1, male, 25, software engineer, gunfight, video 5, comedy} | $s_3$ = 3.8 | 3 | Negative sample |
| $x_4$ = {0, U1, male, 25, software engineer, gunfight, video 9, comedy} | $s_4$ = 3.0 | 4 | Negative sample |
| $x_5$ = {0, U1, male, 25, software engineer, gunfight, video 3, idol} | $s_5$ = 2.1 | 5 | Negative sample |

Then, a ranking indicator $z_{ij\_2}$ generated when the first sample set is in a state shown in Table 2 is calculated through simulation, and the ranking indicator $z_{ij\_1}$ obtained before the positions are exchanged is subtracted from the ranking indicator $z_{ij\_2}$ obtained after the positions are exchanged, to obtain the variation of the indicator $|\Delta z_{ij}|$. For example, the ranking indicator calculated based on the rankings in Table 2 is NDCG@5=1.0, and the ranking indicator calculated based on the rankings in Table 1 is NDCG@5=0.8. Then, the variation of the indicator $|\Delta z_{ij}|=1.0-0.8=0.2$ can be obtained.

To better use the first rule, the second rule, and the third rule, specific implementations of these rules are described below.

Manner 1: The preset algorithm specifies the first rule, the second rule, and the third rule. In this case, the preset algorithm is formula 1-1.

$$p_j \propto \sum_i \frac{|\Delta z_{ij}|}{1 + \exp(s_i - s_j)} \|x_i - x_j\|, \qquad 1\text{-}1$$

where $p_j$ is a sampling probability of a $j^{th}$ negative sample in a first sample set, $s_i$ is an estimated score of an $i^{th}$ positive sample in the first sample set, $s_j$ is an estimated score of the $j^{th}$ negative sample in the first sample set, $x_i$ is an eigenvector of the $i^{th}$ positive sample in the first sample set, $x_j$ is an eigenvector of the $i^{th}$ negative sample in the first sample set, $|\Delta z_{ij}|$ is a variation of an indicator generated after rankings of the $i^{th}$ positive sample and the $j^{th}$ negative sample in the first sample set are exchanged, the first sample set is any one of the plurality of sample sets, and both i and j are positive integers.

Figure 5:
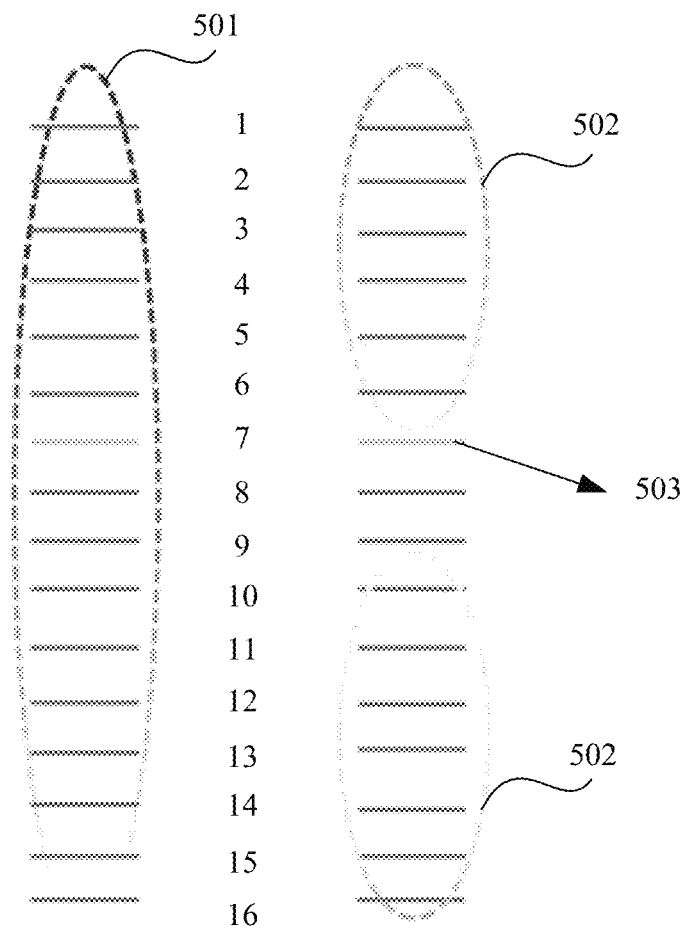
FIG. 5 is a schematic scenario diagram of ranking of estimated scores according to an embodiment of the present disclosure.

The following conclusions can be drawn based on the foregoing formula 1-1: 1. It can be learned, based on $\exp(s_i-s_j)$ in the foregoing formula, that a higher estimated score of a negative sample indicates a higher estimated ranking and a higher sampling probability of the negative sample. An impact of $\exp(s_i-s_j)$ is shown by a dashed line 501 in FIG. 5, and a darker color indicates that a negative sample having a higher ranking has a higher sampling probability. 2. The sampling probability of the negative sample is related to both another negative sample and a positive sample, and this reflects a pairwise idea and improves ranking performance of a final ranking list. 3. $\|x_i-x_j\|$ indicates that a larger distance between a negative sample and a positive sample indicates a higher sampling probability of the negative sample. 4. $|\Delta z_{ij}|$ enables a sampling probability of a negative sample, farther (which means a distance between rankings of estimated scores) away from a positive sample 503, to be higher. As shown by dashed lines 502 in FIG. 5, an impact of $|\Delta z_{ij}|$ may be considered in two parts, namely, before and after the positive sample. A darker color indicates a higher sampling probability caused by $|\Delta z_{ij}|$. For the part before the positive sample, a higher estimated ranking indicates a higher sampling probability that is of the negative sample and that is caused by $|\Delta z_{ij}|$, and for the part after the positive sample, a lower estimated ranking indicates a higher sampling probability that is of the negative sample and that is caused by $|\Delta z_{ij}|$. Therefore, in this application, a higher sampling probability can be assigned to a negative sample having a low ranking.

Manner 2: The preset algorithm specifies the first rule and the third rule. In this case, the preset algorithm is formula 1-2.

$$p_j \propto \sum_i \frac{|\Delta z_{ij}|}{1 + \exp(s_i - s_j)}. \qquad 1\text{-}2$$

Manner 3: The preset algorithm specifies the first rule and the third rule. In this case, the preset algorithm is formula 1-3.

$$p_j \propto \sum_i |\Delta z_{ij}| * (s_j - s_i) \qquad 1\text{-}3.$$

Manner 4: The preset algorithm specifies the first rule and the second rule. In this case, the preset algorithm is formula 1-4.

$$p_j \propto \sum_i \frac{\|x_i - x_j\|}{1 + \exp(s_i - s_j)}. \qquad 1\text{-}4$$

It may be understood that for explanations of related parameters in Manner 2, Manner 3, and Manner 4, refer to the foregoing explanations of the formula 1-1. Details are not described herein again.

Sampling probabilities of a plurality of negative samples or a sampling probability of each negative sample obtained in the foregoing manners is used as a basis for sampling, by the training device, a negative sample. Details are as follows Step S304: The training device selects negative samples from the sample sets based on the sampling probabilities, and adds the negative samples to the training set.

Further, a quantity of negative samples needing to be selected may be preset. For example, the following content is preset A predetermined quantity of negative samples are collected, or a predetermined proportion (a ratio of a quantity of negative samples to a total quantity of samples in the training set, or a ratio of a quantity of negative samples to a quantity of positive samples, or the like) of negative samples are collected, or negative samples in preset duration are collected according to a specific rule (all negative samples collected in the time period are added to the training set), or the like. For ease of description, an example in which a predetermined quantity of negative samples need to be collected is used subsequently to describe how to collect a negative sample.

Solution 1: Collection is performed in descending order of sampling probabilities until a predetermined quantity of negative samples are collected. For example, if there are 1000 negative samples in total, and currently, 100 negative samples need to be collected from the 1000 negative samples, first, the 1000 negative samples may be ranked based on sampling probabilities of the 1000 negative samples. A higher sampling probability indicates a higher ranking, and finally, the first 100 negative samples in the rankings are selected and added to the training set.

Solution 2: An operation the same as that performed on the first sample set is performed on one or more sample sets in the plurality of sample sets, and may be referred to as an operation A. The operation A for the first sample set includes comparing a sampling probability $p_j$ of each of the plurality of negative samples in the first sample set with a random number r ranging from 0 to 1, adding a negative sample whose sampling probability $p_j$ is greater than the random number r to the training set, and deleting the negative sample whose sampling probability $p_j$ is greater than the random number r from the first sample set.

Solution 3: An operation B the same as that performed on the first sample set is performed on one or more sample sets in the plurality of sample sets, and the operation B for the first sample set includes dividing a sampling probability $p_j$ of each of a plurality of negative samples in the first sample set by a reference value $p_{max}$, to obtain a corrected sampling probability $p_j/p_{max}$ of each of the plurality of negative samples, where the reference value is a maximum value in sampling probabilities of the negative samples in the plurality of samples sets, and then comparing the corrected sampling probability $p_j/p_{max}$ of each of the plurality of negative samples in the first sample set with a random number r ranging from 0 to 1, adding a negative sample whose corrected sampling probability $p_j/p_{max}$ is greater than the random number r to the training set, and deleting the negative sample whose corrected sampling probability $p_j/p_{max}$ is greater than the random number r from the first sample set. In this embodiment of this application, $p_j$ is corrected to $p_j/p_{max}$, so that the sampling probability of each negative sample is maximized without destroying a sampling probability distribution (that is, a relationship between relative values of the sampling probabilities of the negative samples remains unchanged). In this way, when a collected random number r is compared with a corrected sampling probability $p_j/p_{max}$, a sampling condition is more easily met, and sampling is performed more quickly, thereby greatly increasing a sampling probability.

For the foregoing solution 2 and solution 3, there are a plurality of manners in a specific implementation process. The following provides an example. In an optional manner, an operation similar to that performed on the first sample set is performed on the plurality of sample sets, and the operation A is performed cyclically each time after the operation A is completed (or the operation B is performed cyclically each time after the operation B is completed) until a predetermined quantity of negative samples are collected. Performing, on the plurality of sample sets synchronously, the operation similar to that performed on the first sample set can improve efficiency of sampling a negative sample. In another optional manner, the operation A (or the operation B) is performed sequentially on the plurality of sample sets until a predetermined quantity of negative samples is collected. In addition, the sampling probabilities (or the corrected sampling probabilities) may be compared with a same random number r or different random numbers r. For example, one random number may be generated for a plurality of comparisons, or one separate random number may be used during each comparison.

Step S305: The training device performs training by using the samples in the training set, to obtain a recommendation model.

Figure 6:
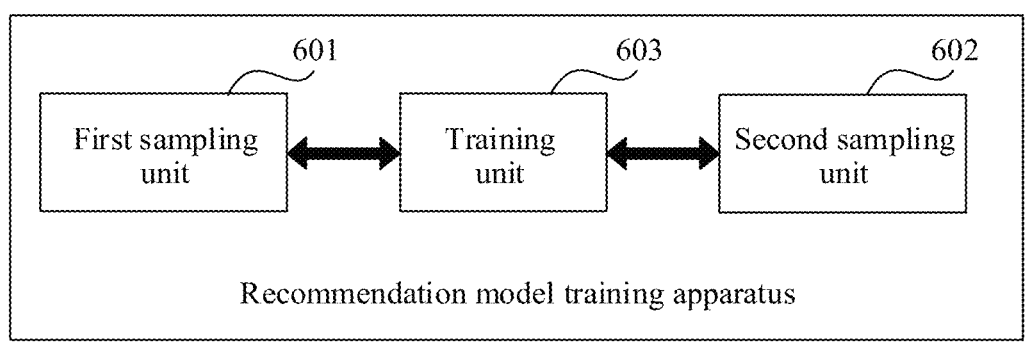
FIG. 6 is a schematic structural diagram of a model training apparatus according to an embodiment of the present disclosure.

Further, training may be performed by using an FTRL algorithm, an LR algorithm, an FFM algorithm, or another algorithm. An algorithm used for training is not limited herein. In addition, an input of training is a sample in the training set, an output of training is the recommendation model, and the recommendation model is used to generate a ranking list of a plurality of to-be-recommended objects. For example, if samples in each sample set are collected when a user operates a video ranking list, the recommendation model is used to generate a ranking list of videos described by the samples. In this embodiment of this application, the recommendation model may further estimate an estimated score of a sample that is subsequently input into the model. It can be learned from the foregoing description of the "preset algorithm" that in a use process of the preset algorithm, an estimated score of each sample needs to be calculated by using the model. The model trained in this embodiment of this application may be used to subsequently calculate an estimated score, and then, the estimated score is used in the preset algorithm to calculate a sampling probability, so that subsequent sampling is performed smoothly. To be specific, as shown in FIG. 6, after first sampling, a recommendation model may be trained for the first time based on a training set obtained through sampling, then, second sampling is performed by using the recommendation model, a recommendation model is trained for the second time based on a training set obtained through second collection, then, third sampling is performed based on the recommendation model, and so on. In other words, in this embodiment of this application, a training process of the recommendation model and a sampling process mutually affect each other. The former affects a sampling probability of the latter, and the latter affects a training set used by the former.

In the method in FIG. 3A, the training device calculates the sampling probabilities of the plurality of negative samples or the sampling probability of each negative sample, then collects some negative samples based on the sampling probabilities and adds the negative samples to the training set, and finally trains the recommendation model by using the training set, to generate a ranking list of objects described by the samples. When the sampling probability of the negative sample is calculated, a relationship between a negative sample and a positive sample (for example, relative values of estimated scores, a vector distance, and a variation of an indicator generated after rankings are exchanged) is fully considered, and a higher sampling probability is assigned to a negative sample that has a greater impact on model training as reflected in the relationship, so that there is a higher probability that the negative sample is considered in a recommendation model training process, to obtain a recommendation model with a better performance indicator.

Figure 3B:
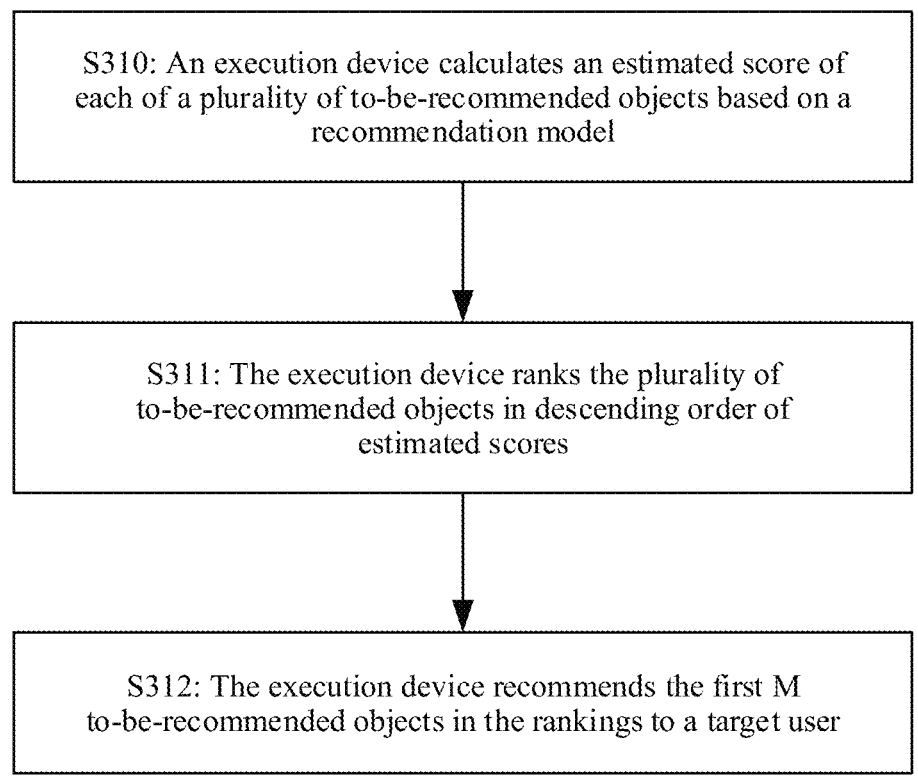
FIG. 3B is a schematic flowchart of a recommendation method according to an embodiment of the present disclosure.

FIG. 3B is a schematic flowchart of a recommendation method according to an embodiment of this application. The recommendation method may be implemented based on the execution device in FIG. 2C. The method includes but is not limited to the following steps.

Step S310: The execution device calculates an estimated score of each of a plurality of to-be-recommended objects based on a recommendation model.

Further, the recommendation model is a recommendation model obtained by using the method in FIG. 3A, and data input into the recommendation model includes object feature information of each to-be-recommended object and user feature information of a target user, and a user to which an object needs to be recommended is the target user. The object feature information and the user feature information have been described above, and details are not described herein again. The method in FIG. 3A also involves an estimated score. The estimated score is used to measure a positive/negative tendency of a sample. A greater tendency of a sample to a positive sample indicates higher attention gained by an object involved in the sample. In other words, the estimated score in the method in FIG. 3A substantially can reflect a degree of attention gained by an object involved in a sample. Similarly, the estimated score in step S310 is substantially the same as the estimated score in the method in FIG. 3A, and can reflect a degree of attention gained by the to-be-recommended object. A higher estimated score of a to-be-recommended object indicates higher attention gained by the to-be-recommended object.

Optionally, alternatively, the data input into the recommendation model may include the object feature information of each to-be-recommended object but does not include the user feature information of the target user. Optionally, alternatively, the data input into the recommendation model may not include the object feature information of each to-be-recommended object but include the user feature information of the target user.

Step S311: The execution device ranks the plurality of to-be-recommended objects in descending order of estimated scores.

Step S312: The execution device recommends the first M to-be-recommended objects in the rankings to the target user.

Further, because a higher estimated score indicates higher attention, the first M to-be-recommended objects in the rankings are to-be-recommended objects gaining highest attention of users. Therefore, recommending the M to-be-recommended objects to the user better meets a user requirement. M may be preset according to a requirement. For example, M may be set to 10. If 100 to-be-recommended objects are ranked by using the recommended model, only to-be-recommended objects whose estimated scores are ranked top 10 are recommended to the target user. Optionally, the ranking operation and the operation of making a recommendation to the user in step S311 and step S312 may be performed by the recommendation model, or may be performed by another model. The two operations can be implemented by configuring corresponding algorithms in a corresponding model.

For example, if the to-be-recommended objects (or items) include video 1, video 2, video 3, video 4, video 5, video 6, video 7, video 8, video 9, and video 10, and the 10 videos currently need to be recommended to a user U1, user feature information (for example, gender is male, an age is 25, and an occupation is software engineer) of the user U1 and object feature information (for example, a video identifier or a video introduction) of each of the 10 videos are input into the recommendation model. Optionally, the recommendation model can calculate estimated scores for the 10 videos. If the scores calculated for the 10 videos are video 1=3.7, video 2=2.2, video 3=4.5, video 4=4.3, video 5=4.8, video 6=1, video 7=2.5, video 8=3.0, video 9=3.2, and video 10=1.1, a ranking result (or list) obtained through ranking in descending order of the estimated scores is shown in Table 3. Finally, objects ranked top 5 (it is assumed that M is preset to be equal to 5) may be recommended to the target user.

TABLE 3

| Recommendation rankings | Video | Estimated score |
|---|---|---|
| 1 | video 5 | 4.8 |
| 2 | video 3 | 4.5 |
| 3 | video 4 | 4.3 |
| 4 | video 1 | 3.7 |
| 5 | video 9 | 3.2 |
| 6 | video 8 | 3.0 |
| 7 | video 7 | 2.5 |
| 8 | video 2 | 2.2 |
| 9 | video 10 | 1.1 |
| 10 | video 6 | 1.0 |

In comparing the foregoing recommendation model training method with several existing technologies (random sampling, dynamic negative sampling (DNS), and optimized LR sampling), and a HUAWEI APPGALLERY data set is used as a test set. In addition, industry-recognized top N ranking test indicators such as NDCG@5, NDCG@10, P@5, and P@10 are selected to measure an effect of an obtained ranking list. After testing, the following conclusions are drawn: (1) Compared with a recommendation model trained without sampling, a model trained in this embodiment of this application performs better in the foregoing test indicators. (2) Compared with the random sampling, the DNS, and the optimized LR sampling, when a ranking list is generated by a recommendation model trained by using a sample sampled in a sampling step in this embodiment of this application, all test indicators are better. NDCG@5 is used as an example, in the recommendation model training method in this embodiment of the present disclosure, performance is improved by 0.0026 compared with non-sampling, by 0.0015 compared with the random sampling, by 0.044 compared with the DNS, and by 0.0026 compared with the optimized LR sampling. Actually, a small increase in an indicator of an offline ranking list may bring about a big increase in online revenue.

The foregoing describes in detail the methods in the embodiments of the present disclosure, and the following provides the apparatus in the embodiments of the present disclosure.

FIG. 6 is a schematic structural diagram of a recommendation model training apparatus 60 according to an embodiment of the present disclosure. The model training apparatus 60 may be the foregoing training device, or may be a component (for example, a chip) mounted on the training device. The model training apparatus 60 may include a first sampling unit 601, a second sampling unit 602, and a training unit 603. The units are described in detail as follows.

The first sampling unit 601 is configured to select a positive sample in a sample set, and add the positive sample to a training set, where the sample set includes the positive sample and negative samples, each sample includes n sample features, n≥1, and the sample features of each sample include a feature used to represent whether the sample is a positive sample or a negative sample.

The second sampling unit 602 is configured to calculate sampling probabilities of the plurality of negative samples in the sample set by using a preset algorithm, where the preset algorithm is obtained based on one or more of a first rule, a second rule, and a third rule, where the first rule is that the sampling probability is negatively correlated with a score difference, the score difference is a difference between an estimated score of a positive sample in a sample set to which a current negative sample belongs and an estimated score of the current negative sample, and an estimated score of any sample is a parameter used to represent a positive/negative tendency of the any sample, the second rule is that the sampling probability is negatively correlated with a vector distance, the vector distance is a distance between an eigenvector of the positive sample in the sample set to which the current negative sample belongs and an eigenvector of the current negative sample, and the eigenvector of the positive sample is an n-dimensional vector including n sample features of the positive sample, and the third rule is that the sampling probability is positively correlated with a variation of an indicator, the variation of the indicator is generated after a ranking of the positive sample in the sample set to which the current negative sample belongs and a ranking of the current negative sample are exchanged, the ranking means ranking, based on the estimated scores, the samples in the sample set to which the current negative sample belongs, and the indicator is a ranking indicator of the samples in the sample set.

The second sampling unit 602 is further configured to select a negative sample from the sample set based on the sampling probability, and add the negative sample to the training set.

The training unit 603 is configured to perform training by using the samples in the training set, to obtain a recommendation model.

In the foregoing method, the apparatus calculates the sampling probabilities of the plurality of negative samples or the sampling probability of each negative sample, then collects some negative samples based on the sampling probabilities and adds the negative samples to the training set, and finally trains the recommendation model by using the training set, to generate a ranking list of objects described by the samples. When the sampling probability of the negative sample is calculated, a relationship between a negative sample and a positive sample (for example, relative values of estimated scores, a vector distance, and a variation of an indicator generated after rankings are exchanged) is fully considered, and a higher sampling probability is assigned to a negative sample that has a greater impact on model training as reflected in the relationship, so that there is a higher probability that the negative sample is considered in a recommendation model training process, to obtain a recommendation model with a better performance indicator.

In an optional solution, the sample features of each sample include an object feature and a user feature, an input of the recommendation model during recommendation includes a feature of a target user and features of a plurality of to-be-recommended objects, an output of the recommendation model is one or more to-be-recommended objects in the plurality of to-be-recommended objects, and the one or more to-be-recommended objects are recommended to the target user.

In an optional solution, the recommendation model is further used to generate an estimated score of a sample that is needed for training a new recommendation model next time. In other words, an estimated score of a sample is indirectly used in a classification model training process, and a trained classification model may in turn generate an estimated score of a sample for subsequent training of a new classification model. In this way, circular iteration can enable a classification model to quickly converge, thereby improving classification model training efficiency and ranking list generating performance.

In an optional solution, objects described by sample features of all the samples in the sample set are objects presented in one ranking list at a same time.

In another optional solution, that the first sampling unit is configured to add a positive sample in each of a plurality of sample sets to a training set according to a preset rule includes adding all positive samples in each of the plurality of sample sets to the training set. Because a positive sample usually is a sample with high attention, fully considering such category of sample during training is equivalent to fully considering requirements of a majority of users, and a ranking list generated by using a classification model trained in such manner better meets a user requirement.

In another optional solution, that the second sampling unit selects a negative sample from the sample set based on the sampling probability, and adds the negative sample to the training set includes that the second sampling unit is configured to divide the sampling probabilities of a plurality of negative samples in the sample set by a reference value, to obtain corrected sampling probabilities of the plurality of negative samples, where the reference value is a maximum value in the sampling probabilities of the plurality of negative samples in the sample set, and successively compare the corrected sampling probabilities of the plurality of negative samples in the sample set with a random number ranging from 0 to 1, and add, to the training set, a negative sample whose corrected sampling probability is greater than the random number. In the manner using correction, the sampling probability of each negative sample is maximized without destroying a sampling probability distribution (that is, a relationship between relative values of the sampling probabilities of the negative samples remains unchanged). In this way, when a collected random number is compared with a corrected sampling probability, a sampling condition is more easily met, and sampling is performed more quickly, thereby greatly increasing a sampling probability.

In another optional solution, the preset algorithm is $p_j \propto \sum_i \frac{|\Delta z_{ij}|}{1 + \exp(s_i - s_j)} \|x_i - x_j\|$;

the preset algorithm is $p_j \propto \sum_i \frac{|\Delta z_{ij}|}{1 + \exp(s_i - s_j)}$;

the preset algorithm is $p_j \propto \sum_i \frac{\|x_i - x_j\|}{1 + \exp(s_i - s_j)}$; or the preset algorithm is $p_j \propto \sum_i |\Delta z_{ij}| * (s_j - s_i)$, where $p_j$ is a sampling probability of a $j^{th}$ negative sample in a first sample set, $s_i$ is an estimated score of an $i^{th}$ positive sample in the first sample set, $s_j$ is an estimated score of the $i^{th}$ negative sample in the first sample set, $x_i$ is an eigenvector of the $i^{th}$ positive sample in the first sample set, $x_j$ is an eigenvector of the $j^{th}$ negative sample in the first sample set, $|\Delta z_{ij}|$ is a variation of an indicator generated after rankings of the $i^{th}$ positive sample and the $j^{th}$ negative sample in the first sample set are exchanged, the first sample set is any one of the plurality of sample sets, and both i and j are positive integers.

The following conclusions can be drawn based on the foregoing formulas: 1. It can be learned, based on $\exp(s_i-s_j)$ in the foregoing formulas, that a higher estimated score of a negative sample indicates a higher estimated ranking and a higher sampling probability of the negative sample. 2. The sampling probability of the negative sample is related to both another negative sample and a positive sample, and this reflects a pairwise (a sample pair) idea and improves ranking performance of a final ranking list. 3. $\|x_i-x_j\|$ indicates that a larger distance between a negative sample and a positive sample indicates a higher sampling probability of the negative sample. 4. $|\Delta z_{ij}|$ enables a sampling probability of a negative sample, farther (which means a distance between rankings of estimated scores) away from a positive sample 503, to be higher.

It should be noted that for implementations of the units, refer to the corresponding descriptions in the method embodiment of FIG. 3A.

Figure 7:
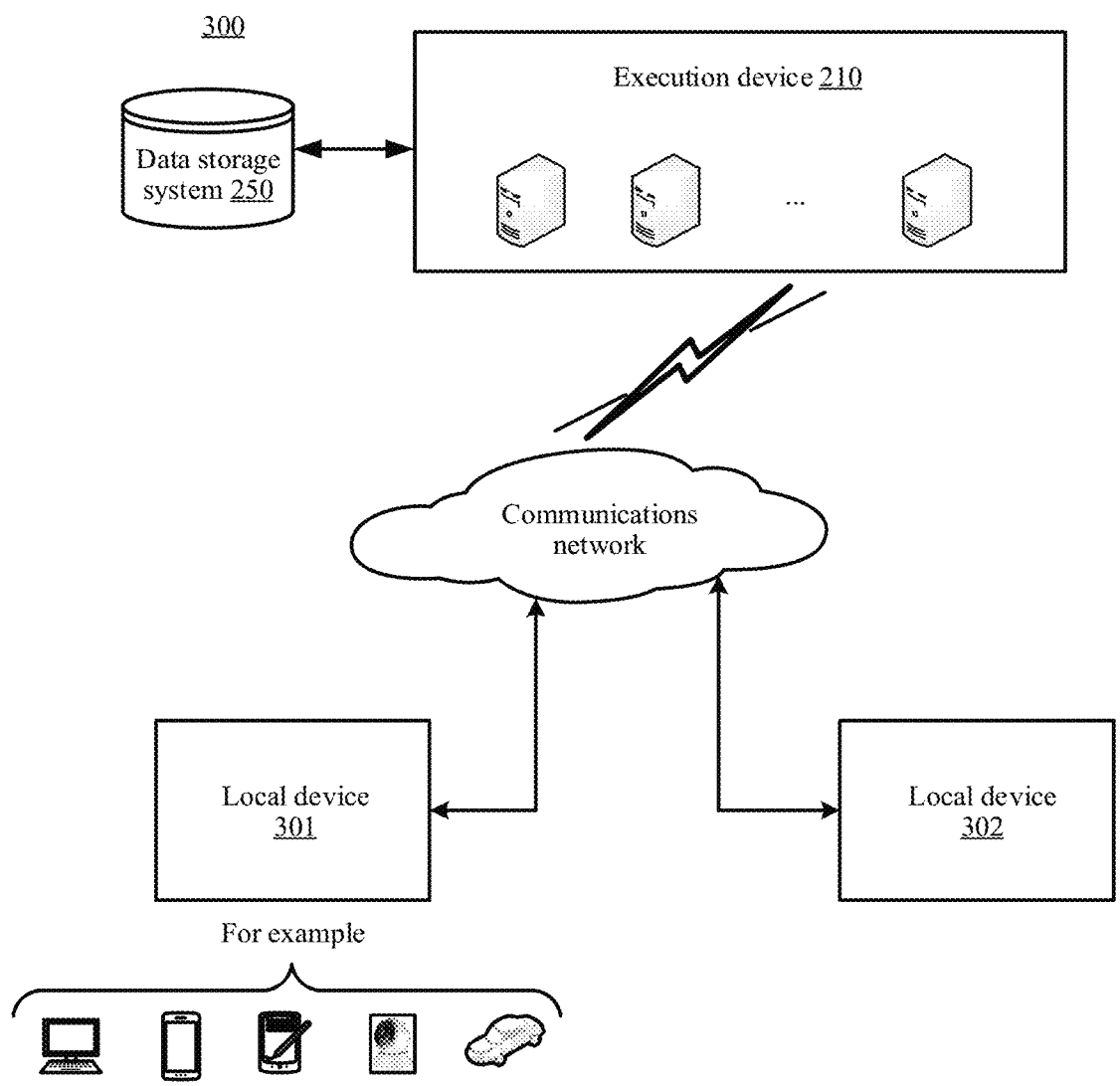
FIG. 7 is a schematic diagram of another system architecture according to an embodiment of the present disclosure.

Referring to FIG. 7, an embodiment of the present disclosure provides a system architecture 300. An execution device 210 is implemented by one or more servers, and optionally cooperates with another computing device, for example, a data storage device, a router, or a load balancer. The execution device 210 may be disposed on one physical site, or distributed on a plurality of physical sites. The execution device 210 may use data in a data storage system 250 or invoke program code in a data storage system 250 to implement an object recommendation function. Further, information about to-be-recommended objects is input into a recommendation model, and the recommendation model generates an estimated score for each to-be-recommended object, then ranks the to-be-recommended objects in descending order of the estimated scores, and recommends a to-be-recommended object to a user based on a ranking result. For example, top 10 objects in the ranking result are recommended to the user.

The data storage system 250 is configured to receive and store a parameter of a recommendation model sent by a training device, is configured to store data of a recommendation result obtained by using the recommendation model, and certainly may further include program code (or an instruction) needed for normal running of the storage system 250. The data storage system 250 may be one device that is deployed outside the execution device 210 or a distributed storage cluster including a plurality of devices that are deployed outside the execution device 210. In this case, when the execution device 210 needs to use the data in the storage system 250, the storage system 250 may send the data needed by the execution device to the execution device 210. Correspondingly, the execution device 210 receives and stores (or temporarily buffers) the data. Certainly, the data storage system 250 may be alternatively deployed on the execution device 210. When deployed on the execution device 210, the distributed storage system may include one or more memories. Optionally, when there is a plurality of memories, different memories are configured to store different types of data, for example, the model parameter of the recommendation model generated by the training device and the data of the recommendation result obtained by using the recommendation model may be separately stored in two different memories.

The user may operate user equipment (for example, a local device 301 and a local device 302) to interact with the execution device 210. Each local device may represent any computing device such as a personal computer, a computer workstation, a smartphone, a tablet computer, a smart camera, a smart car or another type of cellular phone, a media consumption device, a wearable device, a set top box, a game console, or the like.

A local device of each user may interact with the execution device 210 by using a communications network of any communications mechanism/communications standard. The communications network may be a wide area network, a local area network, a point-to-point connection, or any combination thereof.

In another implementation, one or more aspects of the execution device 210 may be implemented by each local device. For example, the local device 301 may provide local data for or feed back a calculation result to the execution device 210.

It should be noted that all functions of the execution device 210 may also be implemented by the local device. For example, the local device 301 implements a function of the execution device 210 and provides a service for a user of the local device 301, or provides a service for a user of the local device 302.

In addition to the foregoing methods and apparatuses, an embodiment of the present disclosure further provides a chip system. The chip system includes at least one processor, a memory, and an interface circuit. The memory, the transceiver, and the at least one processor are interconnected by using a line, and the at least one memory stores an instruction. When the instruction is executed by the processor, the recommendation model training method in FIG. 3A is implemented.

An embodiment of the present disclosure further provides a computer-readable storage medium. The computer-readable storage medium stores an instruction. When the instruction is run on a processor, the recommendation model training method in FIG. 3A is implemented.

An embodiment of the present disclosure further provides a computer program product. When the computer program product is run on a processor, the recommendation model training method in FIG. 3A is implemented.

A person of ordinary skill in the art may understand that all or some of the procedures of the methods according to the foregoing embodiments may be implemented by a computer program indicating related hardware. The program may be stored in a computer-readable storage medium. When the program is executed, the procedures of the foregoing method embodiments may be performed. The foregoing storage medium includes any medium that can store program code, such as a ROM or a RAM, a magnetic disk, or an optical di disc.

What is claimed is:

1. A method comprising:
selecting a positive sample in a sample set, wherein the sample set comprises the positive sample and negative samples, wherein each of the positive sample and the negative samples comprises n sample features, wherein n>1, and wherein a first feature of each of the n sample features indicates whether a corresponding sample is the positive sample or one of the negative samples;
adding the positive sample to a training set;
calculating sampling probabilities of the negative samples using a preset algorithm based on a first rule, a second rule, or a third rule, wherein the first rule indicates that a sampling probability is negatively correlated with a score difference, wherein the score difference is between a first estimated score of the positive sample and a second estimated score of a current negative sample, wherein the first estimated score represents a positive tendency of the positive sample, and wherein the second estimated score represents a negative tendency of the negative sample, wherein the second rule indicates that the sampling probability is negatively correlated with a vector distance, wherein the vector distance is between a first eigenvector of the positive sample and a second eigenvector of the negative sample, and wherein the first eigenvector is an n-dimensional vector comprising the n sample features of the positive sample, wherein the third rule indicates that the sampling probability is positively correlated with a variation of an indicator, wherein the variation is based on exchanging a first ranking of the positive sample and a second ranking of the negative sample, wherein the first ranking and the second ranking are based on the first estimated score and the second estimated score, and wherein the indicator is a ranking indicator of the positive sample and the negative sample;
selecting a negative sample from the negative samples based on the sampling probabilities by:
dividing the sampling probabilities by a reference value to obtain corrected sampling probabilities of the negative samples, wherein the reference value is a maximum value in the sampling probabilities; and
successively comparing the corrected sampling probabilities with a random number ranging from 0 to 1;
adding the negative sample comprising a corrected sampling probability greater than the random number to the training set;
performing training using the training set to obtain a first recommendation model;

obtaining a recommendation result using the first recommendation model; and providing, using an input/output (I/O) interface, the recommendation result to a client device for presenting the recommendation result to a user.

2. The method of claim 1, wherein each of the n sample features comprises an object feature and a user feature, and wherein the method further comprises:

inputting a feature of a target user and features of a plurality of to-be-recommended objects to the first recommendation model during recommendation; and obtaining, from the first recommendation model, one or more to-be-recommended objects in the to-be-recommended objects that are recommended to the target user.

3. The method of claim 1, further comprising generating, using the first recommendation model, a third estimated score of a sample that is needed for training a second recommendation model.

4. The method of claim 1, wherein the n sample features describe objects presented in a second recommendation result at a same time.

5. The method of claim 1, further comprising:
selecting all remaining positive samples in the sample set; and
adding the remaining positive samples to the training set.

6. The method of claim 1, wherein the preset algorithm is:

$$p_j \propto \sum_i \frac{|\Delta z_{ij}|}{1 + \exp(s_i - s_j)} \|x_i - x_j\|;$$

$$p_j \propto \sum_i \frac{|\Delta z_{ij}|}{1 + \exp(s_i - s_j)};$$

$$p_j \propto \sum_i \frac{\|x_i - x_j\|}{1 + \exp(s_i - s_j)}; \text{ or}$$

$$p_j \propto \sum_i |\Delta z_{ij}| * (s_j - s_i),$$

wherein $p_j$ is a sampling probability of a $j^{th}$ negative sample in a first sample set, wherein $s_i$ is an estimated score of an $i^{th}$ positive sample in the first sample set, wherein $s_j$ is an estimated score of the $j^{th}$ negative sample, wherein $x_i$ is an eigenvector of the $i^{th}$ positive sample, wherein $x_j$ is an eigenvector of the $j^{th}$ negative sample, wherein $|\Delta z_{ij}|$ is a variation, of an indicator, generated after rankings of the $i^{th}$ positive sample and the $j^{th}$ negative sample are exchanged, wherein the first sample set is one of a plurality of sample sets, and wherein both i and j are positive integers.

7. The method of claim 1, further comprising storing the recommendation result in a data storage system.

8. A recommendation model training apparatus comprising:
a memory configured to store instructions; and
a processor coupled to the memory, wherein the instructions cause the processor to be configured to:
select a positive sample in a sample set, wherein the sample set comprises the positive sample and negative samples, wherein each of the positive sample and the negative samples comprises n sample features, wherein n>1, and wherein a first feature of each of the n sample features indicates whether a corresponding sample is the positive sample or one of the negative samples;
add the positive sample to a training set;

calculate sampling probabilities of the negative samples using a preset algorithm based on a first rule, a second rule, or a third rule, wherein the first rule indicates that a sampling probability is negatively correlated with a score difference, wherein the score difference is between a first estimated score of the positive sample and a second estimated score of a current negative sample, wherein the first estimated score represents a positive tendency of the positive sample, and wherein the second estimated score represents a negative tendency of the negative sample, wherein the second rule indicates that the sampling probability is negatively correlated with a vector distance, wherein the vector distance is between a first eigenvector of the positive sample and a second eigenvector of the negative sample, and wherein the first eigenvector is an n-dimensional vector comprising the n sample features of the positive sample, wherein the third rule indicates that the sampling probability is positively correlated with a variation of an indicator, wherein the variation is based on exchanging a first ranking of the positive sample and a second ranking of the negative sample, wherein the first ranking and the second ranking are based on the first estimated score and the second estimated score, and wherein the indicator is a ranking indicator of the positive sample and the negative sample;

select a negative sample from the negative samples based on the sampling probabilities by:
dividing the sampling probabilities by a reference value to obtain corrected sampling probabilities of the negative samples, wherein the reference value is a maximum value in the sampling probabilities; and
successively comparing the corrected sampling probabilities with a random number ranging from 0 to 1;

add the negative sample comprising a corrected sampling probability greater than the random number to the training set;

perform training using the training set to obtain a first recommendation model;

obtain a recommendation result using the first recommendation model; and provide, using an input/output (I/O) interface, the recommendation result to a client device for presenting the recommendation result to a user.

9. The recommendation model training apparatus of claim 8, wherein each of the n sample features further comprises an object feature and a user feature, and wherein the instructions further cause the processor to be configured to:
input, to the first recommendation model during recommendation, a feature of a target user and features of a plurality of to-be-recommended objects; and
obtain, from the first recommendation model, one or more to-be-recommended objects in the to-be-recommended objects that are recommended to the target user.

10. The recommendation model training apparatus of claim 8, wherein the instructions further cause the processor to be configured to generate, using the first recommendation model, a third estimated score of a sample that is needed for training a second recommendation model.

11. The recommendation model training apparatus of claim 8, wherein the n sample features describe objects presented in a second recommendation result at a same time.

12. The recommendation model training apparatus of claim 8, wherein the instructions further cause the processor to be configured to:
    select all remaining positive samples in the sample set; and
    add the remaining positive samples to the training set.

13. The recommendation model training apparatus according to claim 8, wherein the preset algorithm is:

$$p_j \propto \sum_i \frac{|\Delta z_{ij}|}{1 + \exp(s_i - s_j)} \|x_i - x_j\|;$$

$$p_j \propto \sum_i \frac{|\Delta z_{ij}|}{1 + \exp(s_i - s_j)};$$

$$p_j \propto \sum_i \frac{\|x_i - x_j\|}{1 + \exp(s_i - s_j)}; \text{ or}$$

$$p_j \propto \sum_i |\Delta z_{ij}| * (s_j - s_i),$$

wherein $p_j$ is a sampling probability of a $j^{th}$ negative sample in a first sample set, wherein $s_i$ is an estimated score of an $i^{th}$ positive sample in the first sample set, wherein $s_j$ is an estimated score of the $j^{th}$ negative sample, wherein $x_i$ is an eigenvector of the $i^{th}$ positive sample, wherein $x_j$ is an eigenvector of the $j^{th}$ negative sample, wherein $|\Delta z_{ij}|$ is a variation, of an indicator, generated after rankings of the $i^{th}$ positive sample and the $j^{th}$ negative sample are exchanged, wherein the first sample set is one of a plurality of sample sets, and wherein both i and j are positive integers.

14. A computer program product comprising computer-executable instructions stored on a non-transitory computer-readable storage medium that, when executed by a processor, cause an apparatus to:
    select a positive sample in a sample set, wherein the sample set comprises the positive sample and negative samples, wherein each of the positive sample and the negative samples comprises n sample features, wherein n>1, and wherein a first feature of each of the n sample features indicates whether a corresponding sample is the positive sample or one of the negative samples;
    add the positive sample to a training set;
    calculate sampling probabilities of the negative samples using a preset algorithm, wherein the preset algorithm is based on one or more of a first rule, a second rule, or a third rule, wherein the first rule indicates that a sampling probability is negatively correlated with a score difference, wherein the score difference is between a first estimated score of the positive sample and a second estimated score of a current negative sample, wherein the first estimated score represents a positive tendency of the positive sample, wherein the second estimated score represents a negative tendency of the negative sample wherein the second rule indicates that the sampling probability is negatively correlated with a vector distance, wherein the vector distance is between a first eigenvector of the positive sample and a second eigenvector of the negative sample, wherein the first eigenvector is an n-dimensional vector comprising the n sample features of the positive sample, wherein the third rule indicates that the sampling probability is positively correlated with a variation of an indicator, wherein the variation is based on exchanging a first ranking of the positive sample and a second ranking of the negative sample, wherein the first ranking and the second ranking are based on the first estimated score and the second estimated score, and wherein the indicator is a ranking indicator of the positive sample and the negative sample;
    select a negative sample from the negative samples based on the sampling probabilities by:
        dividing the sampling probabilities by a reference value to obtain corrected sampling probabilities of the negative samples, wherein the reference value is a maximum value in the sampling probabilities; and
        successively comparing the corrected sampling probabilities with a random number ranging from 0 to 1;
    add the negative sample comprising a corrected sampling probability greater than the random number to the training set;
    perform training using the training set to obtain a first recommendation model;
    obtain a recommendation result using the first recommendation model; and
    provide, using an input/output (I/O) interface, the recommendation result to a client device for presenting the recommendation result to a user.

15. The recommendation model training apparatus of claim 8, wherein the instructions further cause the processor to be configured to store the recommendation result in a data storage system.

16. The computer program product of claim 14, wherein each of the n sample features further comprises an object feature and a user feature, and wherein the computer-executable instructions further cause the apparatus to:
    input, to the first recommendation model during recommendation, a feature of a target user and features of a plurality of to-be-recommended objects; and
    obtain, using the first recommendation model, one or more to-be-recommended objects in the to-be-recommended objects that are recommended to the target user.

17. The computer program product of claim 14, wherein the computer-executable instructions further cause the apparatus to generate, using the first recommendation model, a third estimated score of a sample that is needed for training a second recommendation model.

18. The computer program product of claim 14, wherein the n sample features describe objects presented in a second recommendation result at a same time.

19. The computer program product of claim 14, wherein the computer-executable instructions further cause the apparatus to:
    select all remaining positive samples in the sample set; and
    add the remaining positive samples to the training set.

20. The computer program product of claim 14, wherein the computer-executable instructions further cause the apparatus to store the recommendation result in a data storage system.

* * * * *

UNITED STATES PATENT AND TRADEMARK OFFICE
CERTIFICATE OF CORRECTION

PATENT NO. : 12,411,897 B2  
APPLICATION NO. : 17/360581  
DATED : September 9, 2025  
INVENTOR(S) : Hong Zhu et al.

Page 1 of 1

It is certified that error appears in the above-identified patent and that said Letters Patent is hereby corrected as shown below:

In the Claims

Claim 1, Column 28, Line 24: "n>1, and" should read "n≥1, and"

Claim 8, Column 29, Line 63: "n>1, and" should read "n≥1, and"

Signed and Sealed this  
Twenty-first Day of October, 2025

John A. Squires  
*Director of the United States Patent and Trademark Office*